US009685095B2

(12) United States Patent
Olsen

(10) Patent No.: US 9,685,095 B2
(45) Date of Patent: Jun. 20, 2017

(54) SYSTEMS AND METHODS FOR ASSESSMENT ADMINISTRATION AND EVALUATION

(71) Applicant: SparxTeq Inc, Orem, UT (US)

(72) Inventor: Dan Reed Olsen, Orem, UT (US)

(73) Assignee: SparxTeq Inc., Orem, UT (US)

( * ) Notice: Subject to any disclaimer, the term of this patent is extended or adjusted under 35 U.S.C. 154(b) by 320 days.

(21) Appl. No.: 14/311,577

(22) Filed: Jun. 23, 2014

(65) Prior Publication Data

US 2014/0377733 A1    Dec. 25, 2014

Related U.S. Application Data

(60) Provisional application No. 61/838,531, filed on Jun. 24, 2013, provisional application No. 61/845,190, filed on Jul. 11, 2013, provisional application No. 61/864,991, filed on Aug. 12, 2013.

(51) Int. Cl.
G09B 7/07    (2006.01)

(52) U.S. Cl.
CPC ..................... G09B 7/07 (2013.01)

(58) Field of Classification Search
CPC ... G09B 7/00; G09B 7/02; G09B 7/04; G09B 7/06; G09B 7/07; G09B 7/08; G09B 7/10; G09B 7/12; G09B 11/00
See application file for complete search history.

(56) References Cited

U.S. PATENT DOCUMENTS

2004/0121298 A1*  6/2004  Creamer .................. G09B 7/02
                                                        434/322
2009/0282009 A1* 11/2009  Levey ............... G06F 17/30011
2011/0151423 A1*  6/2011  Venable ................... G09B 7/00
                                                        434/350

OTHER PUBLICATIONS

Mitchell, Tom M., Machine Learning, 1997, p. 29-39, 52-75, 96-97, 176-179, 230-237, McGraw-Hill, USA.
Nagy, George and Seth, Sharad, "Hierarchical Representation of Optically Scanned Documents", Seventh Annual International Conference on Pattern Recognition, Montreal Canada Jul. 30-Aug. 2, 1984, p. 347-349, IEEE Computer Society Press, USA.
Olsen Jr, Dan R., Building Interactive Systems, 2010, p. 390-391, 560-561, 574-575, 578-579, Course Technology, Boston.
Rubine, Dean, "Combining Gestures and Direct Manipulation", Proceedings of the ACM CHI '92 Conference Human Factors in Computing Systems, Monterey, CA, Jun. 3-7, 1992, p. 659-660, ACM Press, New York.

(Continued)

Primary Examiner — Robert J Utama
Assistant Examiner — Kristen Dragon
(74) Attorney, Agent, or Firm — Justin K. Flanagan

(57) ABSTRACT

The present disclosure provides systems and methods relating to administration, evaluation, and review of assessments, such as quizzes and tests. According to various embodiments, a first challenge problem of an assessment may be displayed to an assessor, such as an instructor of students. The first challenge problem may include one or more answers provided by an assessee, such as a student. For example, an assessee may have answered the challenge problem by providing one or more digital ink stroke answers, a draggable object answer, and/or an annotation answer. The systems and methods described herein facilitate the automatic and/or semi-automatic evaluation of the assessee answer items.

19 Claims, 19 Drawing Sheets

(56) References Cited

OTHER PUBLICATIONS

Wobbrock, Jacob O., Wilson, Andrew D. and Li, Yang, "Gestures Without Libraries, Toolkits, or Training: A $1 Recognizer for User Interface Prototypes", Proceedings of the 20th Annual ACM Symposium on User Interface Software Technology, Oct. 7-10, 2007, Newport, RI, ACM Press, New York.

Chrisianni, N. et al., An Introduction to Support Vector Machines and Other Kernel-Based Learning Methods. Cambridge, UK, Cambridge University Press, 2000 p.

\* cited by examiner

SYSTEMS AND METHODS FOR ASSESSMENT ADMINISTRATION AND EVALUATION

RELATED APPLICATIONS

This application claims priority to U.S. Provisional Patent Application No. 61/838,531, titled "SYSTEMS AND METHODS FOR AUTOMATICALLY GRADING DIGITAL INK QUIZZES," filed on Jun. 24, 2013, U.S. Provisional Patent Application No. 61/845,190, titled "SYSTEMS AND METHODS FOR AUTOMATICALLY GRADING OBJECT DRAGGING QUIZZES," filed on Jul. 11, 2013, and U.S. Provisional Patent Application No. 61/864,991, titled "AUTOMATIC GRADING OF ANNOTATED STUDY QUIZZES," filed on Aug. 12, 2013, which applications are all incorporated by reference in their entireties.

TECHNICAL FIELD

This disclosure relates to systems and methods for quiz administration, grading, and feedback. Specifically, the disclosure includes a computer-implementable architecture for administering, grading, and providing feedback with respect to digital ink, object dragging, and annotated study problems.

BACKGROUND

A basic component of education is the assessment of a student's learning. This is not only useful for assigning grades but also for diagnosing deficiencies and recommending ways to improve a particular student's learning. Similarly, it is useful to assess the abilities, knowledge, reasoning, memorization, and/or the like of an assessee in a variety of situations, including education, training, certification, licensing, applications, and the like. One of the most time-consuming and tedious duties of a teacher or other assessor is the grading of assessment activities.

Automatic or semiautomatic mechanisms for grading assessments and providing feedback to students would greatly improve the educational process. The current trend towards Massive Open Online Courses highlights this need for less labor-intensive assessment strategies. When a class contains thousands or even tens of thousands of students, a teacher cannot reasonably hand grade all of the assessments. As students start to learn more independently, there is a serious need for additional assessments to identify where learning has not occurred. Without a teacher playing close attention, more assessment is needed to track progress. With increased assessment comes an increased grading load.

The classic solution to automatic grading has been the multiple choice question. These questions are very easy to grade by hand, and technology to support such question grading has existed for decades. Many students have answered quizzes by coloring in bubbles on a sheet to be scanned by an automatic grading machine. Within a classroom context, "clickers" have been used. These devices allow students to express one of several choices to a question posed by an instructor during class. The instructor gets immediate feedback on how many students selected the various answers. In computer-based coursework such multiple choice answers are indicated by radio button widgets that a student can select.

The big challenge of multiple choice answers is that human knowledge is more complex. Students develop strategies for eliminating choices and guessing at answers without actually developing a real sense of the material. Trying to assess more sophisticated concepts is difficult with multiple choice strategies. Some systems allow students to enter numbers that can be matched against correct answers. Others allow students to type words or short phrases and then provide various rules and schemes by which the instructor can define what a correct answer is. There is a continuing need for more sophisticated ways to pose assessment problems to students and then automatically or semi-automatically grade their answers.

SUMMARY

The present disclosure includes systems and methods relating to the administration, evaluation, and review of assessments, such as quizzes and tests. According to various embodiments, a method for evaluating an assessment, such as a quiz, may include displaying a first challenge problem of an assessment to an assessor, such as an instructor of students. The first challenge problem may include one or more answers provided by an assessee, such as a student. For example, an assessee may have answered the challenge problem by providing one or more digital ink stroke answers, a draggable object answer, and/or an annotation answer. In various embodiments, the challenge problem may include an image, a text, or the like, and the digital ink stroke answer, draggable object answer, and/or annotation answer may be provided with respect to the image, the text, or the like.

The method may include displaying the challenge problem and/or the answers provided by the assessee for the assessor to assess. The assessment by the assessor may be in the form of a feedback tag that is associated with the assessee answer. In some embodiments, a system may sequentially present an assessor with answers to a challenge problem from each of a plurality of assessees. In some embodiments, the assessor may individually assess answers from each of the plurality of assessees for each challenge problem in a set of challenge problems.

In other embodiments, an assessor may provide a feedback tag for a first answer provided by an assessee to a challenge problem of an assessment. In such embodiments, a system, implemented in software, hardware, and/or firmware, may compare answers provided by other students to the same challenge problem with the answer(s) that have already been assessed and tagged by the assessor with a feedback tag.

The system may automatically tag matching answers with the same or similar feedback tag. In various embodiments, the assessor may not need to review or provide feedback to answers that have already been tagged automatically, based on matched answers.

For example, a system may present a first answer to a first challenge problem from a first assessee to an assessor for assessment. The assessor may provide a feedback tag (e.g., a grade, numerical value, comment, etc.) that is associated (e.g., electronically associated) with the first answer. The system may identify one or more answers to the first question from one or more of the other assessees that match (e.g., is similar or identical to, or algorithmically classified as the same) the tagged first answer from the first assessee.

Each of the matched answers may be automatically tagged with the same or similar feedback tag as was manually provided for the first answer by the assessor. The matched and automatically tagged answers may be removed from the review queue of the assessor, reducing the number of answers that must be manually assessed by the assessor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
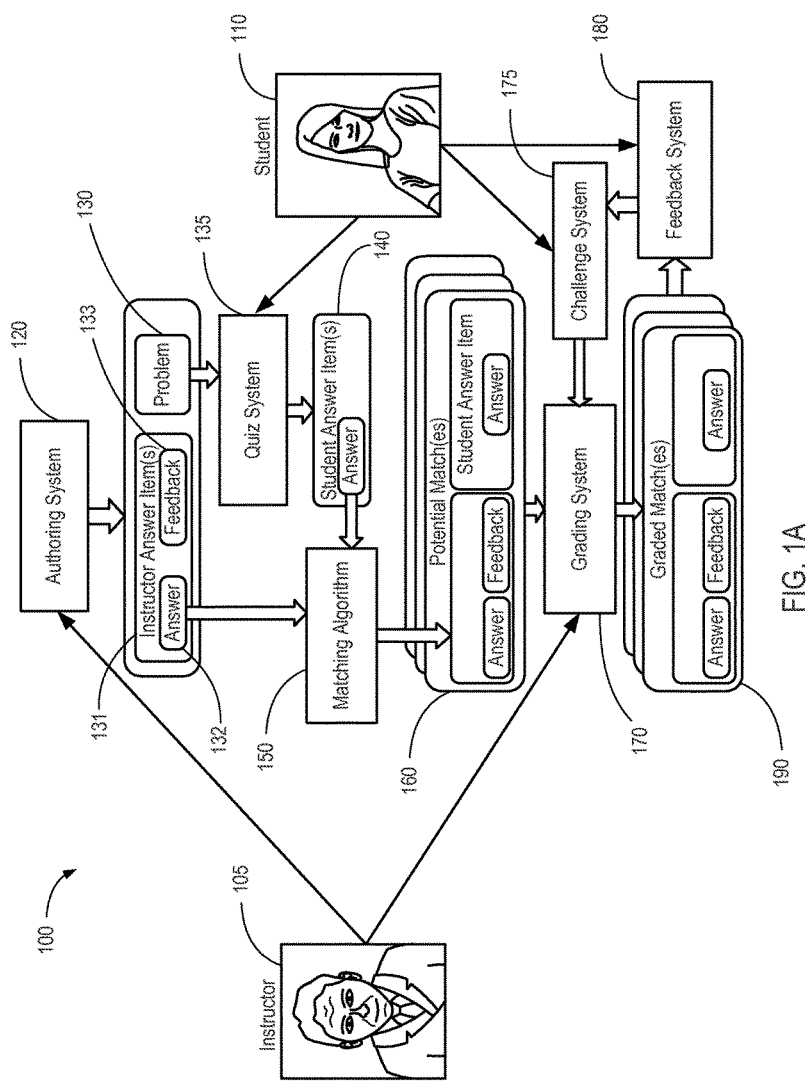
FIG. 1A is a block diagram of one embodiment of a gradable problem system.

This disclosure includes various embodiments of systems and methods relating to assessment administration, evaluation, and review. Specifically, this disclosure provides systems and methods relating to authoring, administering, grading, and providing feedback with respect to challenge problems. Gradable problem systems, including those relating to digital ink stroke answers, draggable object answers, and annotation answers, may include a framework within which problems are authored, assessees provide answers, and assessors express correct answers and feedback for correct and/or incorrect answers. Additionally, the framework may include a mechanism for automatically and/or semi-automatically providing assessees with feedback or another assessment value, such as a grade, score, comment, etc., based on the assessees' answers.

According to various embodiments, a computer-implemented system or method may be described in terms of one or more sub-systems referred to herein as simply "systems" with the understanding that many "systems" may be used together to form a larger system. A system according to the present disclosure may include an interactive authoring system whereby assessors can create new problems and/or express both correct and incorrect answers to those problems. Along with correct and incorrect answers, the assessor may be able to associate feedback messages with particular answers that can be shared with students with matching answers.

The system may also include a quiz system (or more generally an assessment system) within which challenge problems can be posed and assessees can interactively create their answers. The system may also include a matching system that uses one or more matching algorithms to compare assessee answers with assessor answers and/or previously graded answers from other assessees to evaluate the quality of the assessee answers. This matching algorithm may be trainable in that it can improve its performance based on additional information from an assessor.

The system may also include an assessor feedback system (e.g., a grading system) that, in conjunction with a matching algorithm, allows assessors to rapidly assign grades or other feedback to assessees. In addition, the assessor feedback system may generate training examples that can be used to improve the matching algorithm and to improve feedback given to assessees. The assessor feedback system, in conjunction with the matching algorithm, may increase the grading efficiency and/or the quality of feedback provided by the assessor.

The system may also include an assessee feedback system whereby assessees are shown the results of the assessor feedback system in a way that they can understand what they did wrong and receive feedback from the assessor that may guide them to correct the problem. In particular, the assessee feedback system may show and explain the differences between the assessees' answers and the assessor's correct answers. The system may also include a challenge system whereby assessees can argue in favor of their answers or against an assessor's answer. For example, an assessee may disagree with the feedback provided via the assessor feedback system and dispute a grade. The disputed feedback may be escalated for manual review by the assessor or an associated individual.

Any description or definition of any term provided herein is provided by way of example and is not intended to provide a limiting description or definition. That is, any definition or description of any term should be accorded its broadest reasonable interpretation in the context of a person of reasonable skill in the art. All descriptions and definitions provided herein are merely provided as examples within the expansive and inclusive understanding of each of such terms.

As used herein, an assessor includes anyone engaged in the creation of materials, delivery of materials, or evaluation of materials or individuals. Examples of an assessor include, but are not limited to, an individual; a group of teachers, instructors, supervisors, trainers, certifiers, licensors, application evaluators, or admissions evaluators; and/or other individuals or agencies engaged in evaluating an ability or a knowledge of one or more assessees.

As used herein, an assessee includes anyone assessed via an assessment by an assessor. Examples of assessees include, but are not limited to, individuals; groups of students, trainees, instructees, supervised employees or supervised volunteers, those seeking licensure, those seeking admission, or applicants; and/or others engaged in demonstrating an ability or a knowledge to one or more assessors.

As used herein, a pixel may be a data representation for a single point of light on a two-dimensional surface. A pixel may include a single bit representing dark or light. A pixel may be a single number representing varying levels of gray ranging from dark to light. A pixel may include three numbers for each of the colors red, green and blue. Combinations of these color levels can represent any color visible to the human eye. A pixel may also include an additional number to represent transparency or opacity.

As used herein, an image may be a two-dimensional array of pixels where each pixel represents its own lighting value. This combination of pixels may be converted into a visible image that can be perceived by a human being. An image may also include compressed forms from which an array of pixels can be reproduced. Examples of images are the formats GIF, PNG, JPEG and others, as well as the pixels transmitted by remote display systems such as VNC.

As used herein, text may include both image-based text and machine-encoded text. For example, a sequence of data codes that represents the components of some written language. Such a sequence of data codes is capable of being rendered by an algorithm running on a computer so as to produce a human readable version of the source written language. Such data encodings include ASCII, ISO-latin and UNICODE, as well as other less popular representations of written language. Text may also refer to compressed forms of such data.

As used herein, a rendering includes the process of converting some data structure into an image that can be displayed to a human being. There are many possible such data structures including HTML, Scalar Vector Graphics (SVG), and PostScript, to name a few. Presenting and displaying can be performed via any of a wide variety of audio, visual, haptic, and/or other electronic delivery approaches, including, but not limited to electronic displays, speakers, electronic reader devices, electronic braille devices, cell phones, laptops, computers, projectors, personal electronic devices, and/or the like.

As used herein, a drawing includes a data structure that can be rendered into an image. In particular it may include a data structure that includes a list of graphics primitives. Graphics primitives are geometric shapes such as lines, circles, ovals, polygons, curves, images, etc. The rendering process includes taking each geometric primitive and performing its drawing operation that converts that primitive into pixel changes in an image. There are many graphics packages that define sets of drawing instructions from which a drawing can be assembled. These include X-Windows, PDF, PostScript or Microsoft RDP. A drawing may also be represented as a data structure of display primitives from which the visual presentation of the drawing can be generated. Examples of this include Microsoft WPF, Java FX, VRML, OpenGL or HTML.

As used herein, a digital ink stroke may simulate the mark that might be made on a piece of paper using a pen or pencil. Just as a mark by a pen or pencil is made relative to a sheet of paper, a digital ink stroke may be spatially defined relative to a challenge problem. A digital ink stroke may include a sequence of two-dimensional points that can be thought of as being connected by line segments to form a complete stroke.

Interactively, a digital ink stroke may be created by a start event, multiple move events and/or an end event. The start event might be a mouse press, pen press, finger touch to a surface or any other input event that is accompanied by a two-dimensional point that is the start of the stroke. The move events may be generated as long as the stroke is substantially continued and the two dimensional point is changed. For example, this might be movement while a pen or finger stays in contact or a mouse button remains pressed. There may be many of these that make up the majority of the stroke's points. Each move event adds a point to the stroke. The end event includes any user action that indicates that points are to no longer be added to the stroke. This might be removing a pen or finger from a surface or releasing a mouse button.

Digital ink strokes can also be retrieved from images. There are a variety of image processing techniques that will extract a sequence of connected points from an image. These can be used as a digital ink stroke.

A digital ink stroke may be color independent where the color of the pixels is irrelevant. It may also be the case that a digital ink stroke has a color which is shared by all of the points in the stroke and their connecting line segments. The color of a digital ink stroke may also be transparent or have some other transfer function defined so that when the stroke is drawn over other image material, the other image partially shows through. Digital ink strokes may be referred to herein interchangeably as simply "strokes."

As used herein, video includes a data representation of a sequence of images that can be presented to a human being at a rate sufficient to be perceived as continuous motion. This also includes data representations capable of presenting continuous motion whether or not the content of that data representation actually contains continuous motion. Video may optionally include audio that is synchronized with the image sequence.

As used herein, audio includes any data representation of sound. This would include any form of data from which an algorithm running on an appropriately configured computer could produce sounds audible to human beings.

As used herein, digital media includes any combination of text, drawing, image, digital ink stroke, audio or video. A digital media creation tool may be embodied as software that allows a user to create any, some or all of these forms or some combination of them. Creation may be by interactive manipulations by the user, through one or more acquisition devices such as scanners, microphones or cameras, or any combination of these approaches. Digital media may also include references such as URLs or other such mechanisms for locating other digital media to be included.

As used herein, a click includes a brief indicator of a particular two-dimensional point using some interactive input device. Examples include the press and release of a computer mouse button, or a tap on a touch screen with the finger or on a tablet with a stylus. The click may be a single two-dimensional point that is indicated and for which the expression of the point is brief.

As used herein, a drag includes an indication of the movement of some object on a display screen. A drag may be initiated by the indication of a two-dimensional start point. This start point may be used to select the displayed object to be moved. There is then a movement phase where successive new two-dimensional points are input from the user. The object being moved may or may not follow the movement points, and other highlighting action may or may not indicate the result of terminating the drag at that point. After one or more movement points there is a final drop point that indicates the two-dimensional point where the object should be dropped.

As used herein, the term "set" may include a non-zero quantity of items, including a single item.

Examples of dragging include: pressing a mouse button to start the drag, moving the mouse while holding down that button and then releasing that mouse button at the drop point. A stylus press, move and release can be used as a drag. A finger touch, hold down while moving and lift can be used as a drag.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps or sequences of steps need to be executed only once or even in the same order in subsequent repetitions.

Figure 1B:
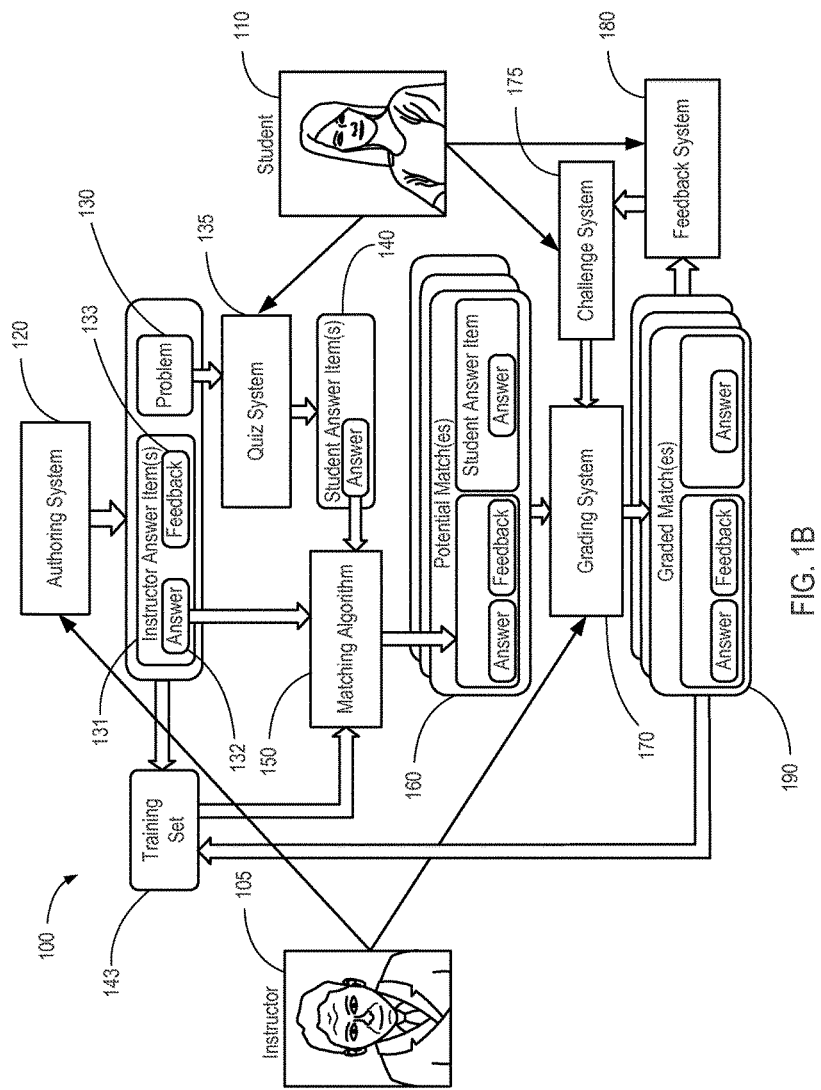
FIG. 1B is a block diagram of another embodiment of a gradable problem system explicitly showing the training module described in FIG. 1A.

FIGS. 1A and 1B illustrate simplified block diagrams of possible embodiments of a gradable problem system 100 for authoring, administering, grading, and providing feedback with respect to challenge problems. As illustrated, the system 100 may include a grading system 170, an authoring system 120, a matching system 150 and 160, an assessor feedback system 160, an assessee feedback system 180 and 190, and/or a challenge system 175. A description of each is provided below under a corresponding heading. It is appreciated that every compatible permutation of each of the various embodiments described herein is contemplated, even when such permutations and combinations are not explicitly described.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes one or more processor and/or memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tapes, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, class, etc., that perform one or more tasks or implement particular abstract data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers, computer programming tools and techniques, computer networks and networking technologies, digital storage media, authentication, access control, and other security tools and techniques provided by public keys, encryption, firewalls, and/or other means.

Assessment System

An assessment system (of which quiz system 135 is an illustrated embodiment) may present challenge problems to assessees 110, such as for example students 110, on an individual or group basis and interactively accept their answers 140. The assessment system may be embodied as software, firmware, and/or hardware. The system may operate on a single computing device or may have portions of the system running on separate computing devices communicating over a network. For example the set of challenge problems may be on a server and assessees 110 may interact via a personal computer, tablet or other computing device.

A challenge problem 130 may be any combination of drawing, image, text, video, and/or audio data object that the assessee 110 would understand as a challenge in the context of the material. The challenge problems 130 may be presented to an assessee 110 on some computing device, and the assessee 110 may use an interactive user interface to create one or more student answer items 140 in response to each challenge problem 130. An assessee 110 answer item 140 may include a data object interactively created by the assessee 110 that represents all or a portion of an assessee's answer item 140 to the problem 130. An answer item 140 may include some information that the assessee 110 believes resolves the challenge posed by the problem 130.

For example, a multiple choice quiz system 135 might have a problem 130 represented by a string of text that asks a question and multiple strings of text with possible answers. A student 110 might create answer items 140 by selecting one of the answers 140 on the screen or striking a key corresponding to one of the answers 140. The answer item 140 may be embodied as data that encodes the student's answer selection.

There are many possible assessment systems. One way to categorize the various assessment systems is based on the differences in the nature of the possible answer items 140 that an assessee 110 might express. The multiple choice quiz system 135 in the preceding paragraph is an example of the many possible assessment systems.

Authoring System

An authoring system 120 may allow assessors 105, such as teachers, instructors, licensors, etc., to create challenge problems 130 suitable for presentation through a particular assessment system, such as quiz system 135. A challenge problem case may include a problem 130, a scoring rule and zero or more instructor answer items 131, that may include an answer 132 to the challenge problem 130 and/or an associated feedback tag(s) 133. An interactive user interface may allow the assessor 105 to create new problems 130. Such problems 130 can be created from scratch using text, image editing, drawing or some other means. Challenge problems 130 may also be created by assembling material from another source such as copying from a textbook or capturing with a camera.

The authoring system 120 may also allow the assessor 105 to create one or more assessor answer items 131 to be used in evaluating assessee answers 140. In some embodiments, the assessor 105 may create assessor answer items 131 during the grading system 170 rather than during the authoring process. An assessor answer item 131 may contain an answer 130 of the same or similar form as that created by assessees 110 in the assessment system. An assessor answer item 131 may also contain scoring information or other feedback information 133 that describes how assessee scores are to be assigned based on this answer item 140. An assessor answer item 131 may also contain feedback 133 in the form of comments or instructions. The feedback comments 133 may be explanatory, critical, or congratulatory.

For example in some embodiments, a feedback comment 133 may include any combination of text, drawing, image, audio or video that will help the assessee 110 better understand the learning issue represented by an assessor answer item 131. There may be multiple assessor answers 132 that are part of the same answer item 131 and that share the same augmented score and feedback information 133. This is useful when there are several ways in which the same answer might be expressed or the same assessee error.

The assessor answer items 131 created in an authoring system 120 may either be correct assessor answer items 131 that correctly answer the problem 130 or incorrect assessor answer items 131 that predict common assessee mistakes. The feedback 133 on correct answer items 140 may explain to assessees 110 who have answered incorrectly what mistake they made or how or why they made a mistake. The feedback comments provided to the assessee, at 190, may also contain references to learning materials that might help the assessee 110 master the relevant concepts.

Incorrect assessor answer items 131 may be provided by the assessor to represent common or possible errors that assessees 110 may make when faced with a particular challenge problem 130. Incorrect assessor answer items 131 may also be augmented or tagged with scoring information that indicates how an assessee's score, other assessment value, or feedback tag 133 should be applied if the assessee 110 provides an answer item 140 that matches an incorrect assessor answer item 131. In some embodiments, the feedback 133 associated with an incorrect assessor answer item 131 may indicate why an assessee answer 140 is wrong and guide the assessee 110 to remedial material.

A scoring or other feedback rule may be associated with an algorithm 150 for assembling scoring information from matching assessor answer items 131 and producing a resulting numeric score or other assessment value for a challenge problem 130 or set of challenge problems 130. A simple scoring rule is to sum all of numeric scores associated with matching answer items. An alternative scoring rule might be the maximum score of all the items or perhaps the sum of the highest three scores.

In various embodiments, an authoring system 120 may support multiple scoring rules, and the assessor 105 may select one or more of them for each problem via a user interface of the authoring system 120. The authoring system 120 may also include a default scoring rule that may be applied in the absence of the assessor 105 choosing a rule. Scoring information may include data, such as a numerical or letter-grade value, about a particular answer item 132.

As a specific example, in an educational institution an authoring system 120 might allow instructors 105 to type a paragraph of text that poses a problem 130. The answer items expected in this example system may include phrases or short sentences typed by the student 110. In addition to a system that allows the instructors 105 to type or capture the problem text, the authoring system 120 may allow the instructor 105 to type phrases as example answer items 132. Some may be correct answers and some not. Each example answer phrase would be augmented with scoring information and/or feedback 133.

Matching Algorithm

An automatic grading system 170 may include an algorithm that assigns grades and feedback for assessee answer items 140. Automating this style of gradable problem system may utilize a matching algorithm 150. In some embodiments, the matching algorithm 150 may compare the answer items 140 generated by an assessee with the assessor answer items 131 generated by the assessor and return a data structure that describes which answer items 140 match which assessor answer items 131. The matching algorithm 150 may also consider assessor answer items generated from assessee answer items through the grading system 170.

In various embodiments, the comparison of assessee answer items 140 and assessor answer items 131 may return four categories of results:

Case 1: the set of assessee answer items 140 that are matched by correct assessor answer items 131;
Case 2: the set of assessee answer items 140 that are matched by incorrect assessor answer items 131;
Case 3: the set of assessee answer items 140 that are not matched by any assessor answer items 131; and
Case 4: the set of correct assessor answer items 131 that are not matched by any assessee answer items 140.

Confidence

In some embodiments, the matching algorithm 150 may produce a confidence for its result. For example, a confidence value may generally range between 0.0 and 1.0 or between 0% and 100%. A confidence value may be associated with a rough estimate of the probability that a particular match produced by the matching algorithm 150 is correct. The confidence of a match can be used in the grading system 170 to advise an assessor 105 when it might be safe to automatically accept some automatic matches and thus reduce assessor effort.

Features

One of the differences between various gradable problem systems is in the features that are computed from the answers. These features may enhance the performance of the automatic grading system 170 embodied in the matching algorithm 150. A feature may be defined as a numeric or nominal value that can be computed from an example of an answer item 140. The kinds of matching and classification algorithms 150 used in this work are normally based on a set of such features being computed. Various kinds of answer items have their own feature sets. The selection of a good feature set may impact the quality of the automatic grading system 170.

Machine Learning Approach

The matching algorithm 150 may utilize one or more of a wide variety of algorithms. The matching algorithm 150 can be thought of as a classification problem where each feedback tag 133 represents a class and the answer items 132 associated with each feedback tag 133 are the training examples for that class. A classifier may include an algorithm that processes data (such as the features of an assessee answer item 140) and returns the class that the answer belongs to. There may be a finite set of such classes (e.g., embodied in the set of unique feedback tags 133). In machine learning, classifiers are trained using training examples. Training a classifier may include accepting a set of training examples for each class to be trained and then generating the classifier algorithm. There are many techniques for training classifiers. Training examples include pieces of data of the same form as the classifier will classify. In some embodiments, training examples are answers that are part of feedback tags 133.

Adding additional training examples may improve the accuracy of the matching algorithm 150. The accuracy of the matching algorithm 150 may be improved when it has a higher probability of correctly associating an assessee answer item 140 with the appropriate feedback tag 133.

As illustrated in FIG. 1B, a training set 143 may receive assessor answer items 131, including assessor answers 132 and/or feedback tags 133. Matching algorithm 150 may use the training examples to identify matches in the assessee answer items 140. In various embodiments, the graded matches 190 generated as part of the grading system 170 with or without assessor input/help may be returned to the training set 143 to further adjust, modify, and possibly improve the accuracy and/or efficiency of the matching algorithm 150.

A classifier may be created from the answers in the feedback tags 133. This classifier may then be applied to each answer item 140 provided by the assessee 110. Using this approach, Case 1 above might include all assessee answer items 140 that were classified as the class represented by one of the assessor's correct feedback tags 133.

Case 2 might include all assessee answer items 140 that were classified as the class represented by one of the assessor's incorrect feedback items 130. Case 3 may include assessee answer items 140 for which the matching algorithm cannot identify the class of the assessee's answer. Case 4 may include a set of correct assessor feedback tags 133 that had no assessee answer items 140 in that class.

There are a variety of machine learning algorithms that can be used to classify assessee answer items 140. They include Naïve Bayes, Version Spaces, Support Vector Machines, Decision Trees, and many others. Examples of such algorithms and other relaxant material can be found in: Christianini, N. and Shawe-Taylor, J., *An Introduction to Support Vector Machines and Other Kernel-based Learning Methods*, Cambridge University Press (2000); Mitchell, T. M., *Machine Learning*, McGraw-Hill (1997); Olsen, D. R., *Building Interactive Systems*, Course Technology, Cengage Learning (2010); Rubine, D., "Combining gestures and direct manipulation" in *Proceedings of the SIGCHI Conference on Human Factors in Computing Systems* (CHI '92), Penny Bauersfeld, John Bennett, and Gene Lynch (Eds.), ACM, New York, N.Y., USA, 659-660; and Wobbrock, J. O., Wilson, A. D. and Li, Y., "Gestures without libraries, tool kits or training: A $1 recognizer for user interface prototypes," *Proceedings of the ACM Symposium on User Interface Software and Technology* (UIST '07), Newport, R.I. (October 7-10, 2007), New York: ACM Press, pp. 159-168, each of which publications is incorporated by reference in its entirety.

Simple Distance Metric

Classifiers, such as "nearest neighbor," rely on a distance metric that returns a measure of difference between two answer items 140. In many cases there will be a set of N features that are computed from an answer item. To compare two answer items 140 there is a distance metric that can be computed between the features from each answer item. The Manhattan distance is the sum of the absolute values of the differences between feature values. The Euclidian distance is the sum of the squares of the feature differences. There are other distance metrics with various properties. Any combination thereof, including weighted combinations, is also possible.

Not all features may have the same range of values. This can distort the distance metric. One solution is to divide all feature values by their standard deviation across all of assessor answer items 131. This may provide a unified range of values.

The matching algorithm may determine how large the difference function result can be before two answers are considered to not match. One approach is to set this difference to a relatively small value and then add more example answers to each answer item to broaden the possible matches.

Not all features of an answer may be useful in classifying for computing distance for a particular problem. One approach is to give each feature a weight. That feature's difference is multiplied by the weight before computing the difference metric. Larger weights will cause those features to be more dominant than those with smaller weights. There are a variety of mechanisms for computing these weights. Many approaches compare the distribution of a feature's values across all answers to the distribution across each of the answer items individually. Wide differences across all answers coupled with small differences across particular items indicate that such features help to separate the answer items from each other. Classifiers such as decision trees automatically select a few important features to consider based on their training algorithm.

Distance Metric Used to Generate Confidence Measures

If a given assessee stroke S (or draggable object answer or annotation answer) S has been given a match decision D we may want to compute a confidence C in that decision. One approach using a distance metric to compute confidence is to find the K closest neighbors to stroke S. We can then compute confidence C=number of neighbors with the same class as S divided by K. The larger the value of K the more reliable the confidence measure will be.

Grading System

A grading system 170 may verify that the results of the matching algorithm 150 represent a correct grading and/or produce appropriate feedback for the assessee 110. The feedback to the assessee 110 may be derived from the assessor's feedback tags 133 and the match produced by the matching algorithm 150. Therefore one purpose of the grading system 170 may be to verify and/or repair the results of the matching algorithm 150. For instance, the grading system 170 may reject matches with a confidence level below a threshold value. Once a correct match is determined, the assessee feedback can be automatically derived.

The grading system 170 may include a visual presentation of the match results to the assessor 105, an interactive mechanism for the assessor 105 to repair the results of the matching algorithm 150 and a mechanism for feeding those repairs back into the matching algorithm 150 so its performance can be enhanced. The visual presentation of the match results and the interactive mechanism for repairing results may vary widely among different gradable problem systems. The mechanism for feeding repairs back into the matching algorithm is to add new answers to existing assessor feedback tags 133 or to add new assessor feedback tags 133. The selection or creation of an assessor answer item 131 to associate with a particular assessee stroke, draggable object answer, and/or annotation answer item may be referred to as a grading decision.

There are at least four kinds of repairs that can be facilitated by the grading system 170. They can be separated out based on the four cases coming from the matching algorithm 150 described above.

As described above, Case 1 includes an assessee answer item 140 that matches a correct assessor answer item 131. Sometimes the match may be correct. However, in some cases the match may be incorrect. The matching algorithm 150 may say the assessee answer item 140 matches a correct assessor answer item 131 when it in fact does not.

In such a circumstance, the grading system 170 may allow the assessor 105 to associate the assessee's answer item 140 with a different existing assessor feedback tag 133. This will add the assessee's answer item 140 to the alternative assessor feedback tag 133 and will associate the corresponding new score and feedback with that assessee answer item 140.

The assessor 105 may create a new assessor feedback tag 133 with its own scoring information. This new feedback tag may be associated with the assessee's answer item 140. The new feedback tag 133 with the assessee answer item 140 is added to the training set as a new assessor answer item 131, which may augment or otherwise modify the matching algorithm's performance.

The system may assert that a match has been identified with some degree of quantifiable confidence. If the confidence is high, the assessor 105 may not want to, may not be required to, or may not be asked to provide a grading decision. If the confidence is low, the assessor 105 may want to, may be forced to, and/or may simply be asked to approve the automatically assigned feedback. Once graded and/or matched, the assessee answer item 140 may be added as a training example to the matching assessor answer item 131. This additional data may increase the confidence level in future matches.

As described above, Case 2 includes an assessee answer item 140 that matches an incorrect assessor answer item 131. In various embodiments, this may be a correct grading result in which the proper feedback tag (e.g., a grade) may be assigned. However, in some cases the assessee answer item 140 may actually be correct or incorrect for a reason different from that indicated by the match. In such situations, an assessor 105, potentially via the grading system 170, may manually identify a match with an existing assessor answer item 131. Alternatively, the assessor 105 may manually enter a new assessor answer item 131 and enter associated feedback tags, such as scoring information, letter grades, comments, explanatory text, etc.

Again, if the confidence in this match is above threshold, this decision may be automatically passed on to the assessee 110. If the assessor 105 makes a grading decision, then this assessee answer item 140 is added to the training examples for the assessor's answer item 131 to boost the algorithm's confidence.

As described above, Case 3 includes assessee answer items 140 that do not match any assessor answer item 131. This means that the matching algorithm 150 failed to identify a match with a sufficiently high confidence level, or to even find a match at all. The feedback or grading may be applied to this answer. The answers may be presented to the assessor 105 for evaluation. The feedback tags provided by the assessor 105 may be used for subsequent matches by the matching algorithm 150 and/or the grading system 170.

As described above, Case 4 may include situations in which answer item 131 identified as correct are missing from the assessee answer items 140 for a particular challenge problem 130. In various embodiments, the assessee's challenge problem 130 may be tagged with one or more feedback tags that indicate the lack of a correct answer. For example, an assessee 110 may receive a point deduction for a missing answer item 140. In other embodiments, a missing item may not be associated with a negative score, but rather just a lack of a positive score.

Assessee Feedback System

The system may also include the ability to provide assessees 110 with feedback on their answers. The assessee feedback system 180 may take the results of the grading system 170 and generate visual and/or interactive information that shows the assessee 110 the score that the assessee received, the reasons for that score and the feedback associated with the grading. This feedback may originate from the matching of assessee answers items 140 to answer item 131 as filtered through the grading system 170. After the grading system 170 has finished either automatically matching each assessee answer item 140 or manually requesting feedback tags from an assessor 105, every or nearly every assessee answer item 140 should be associated with one or more feedback tags.

The assessee feedback system 180 may then display each assessee answer item 140 in the context of the original problem. With each such answer item, the scoring information and feedback from the attached assessor answer item 131 can be displayed. This display may show the assessee 110 what the assessee did right or wrong and how the assessee was scored, and provide the feedback the assessee needs to guide future work.

In some embodiments, there may also be assessor answer item 131 that were not matched by the assessee answer items 140 (Case 4 in the grading system 170). These answer items may also be displayed to the assessee 110 as part of the feedback, along with their scoring information and feedback associated with the assessor answer item.

In addition, to the individual answer feedback, the scoring rule associated with the problem is evaluated and the resulting score attached to the assessee's answers. This score may be provided as feedback to the assessee 110. As may be appreciated, the scoring and other feedback tags associated with individual answer items, challenge problems, and/or sets thereof may be adapted for various types of tests, quizzes, studies, certification exams, entrance exams, etc.

In some embodiments, grading and/or scoring may be done via letter grades (e.g., A, B, C, D, F), numerical scoring (e.g., percentages, number ranges, etc.), and/or even symbolic scoring (e.g., a number of stars, smiley faces, explanation points, etc.). In some embodiments, a summation or other algorithm may be used to provide feedback to an assessee that he or she has received a passing or failing grade, certification, licensure, admittance, etc. Similarly, grades and scoring may be irrelevant for some situations. In some embodiments the assessee feedback system 180 may provide commentary and/or instructional or explanatory information in addition to or instead of feedback tags for each answer item 140.

Challenge System

In a gradable problem system there may be a variety of ways in which grading errors may occur. The matching algorithm 150 may incorrectly grade an assessee answer item 140 with high confidence. This may cause the grade to not be reviewed by an assessor 105. The assessor 105 may be in a hurry or tired from a large quantity of grading and may make a mistake. The assessor 105 may misinterpret the assessee's answer because it has been expressed in an unusual way.

A challenge system 175 is a mechanism whereby an assessee 110 can use the feedback that the assessee received and express disagreement with some portion of the feedback tags (e.g., the grades or comments). Disagreement might possibly be expressed in any combination of text, drawing, image, audio or video. Disagreement may also include references to text or other class materials that support the assessee's case. Disagreement may be associated with the particular problem in question or a particular portion of a problem, or even a particular answer item to a challenge problem.

The preceding paragraphs provide a description of the various systems and sub-systems described in conjunction with FIGS. 1A and 1B. Additional descriptions, embodiments, and examples are provided below with reference to FIGS. 2-18, in addition to those elements referred to in FIGS. 1A and 1B. Reference throughout this specification to "one embodiment" or "an embodiment" means that a particular feature, structure, or characteristic described in connection with the embodiment is included in at least one embodiment. Thus, the appearances of the phrases "in one embodiment" and "in an embodiment" in various places throughout this specification are not necessarily all referring to the same embodiment. In particular, an "embodiment" may be a system, an article of manufacture (such as a computer-readable storage medium), a method, and/or a product of a process.

Furthermore, the described features, operations, or characteristics may be combined in any suitable manner in one or more embodiments. The order of the steps or actions of the methods described in connection with the embodiments disclosed may be varied. Thus, any order in the drawings or Detailed Description is for illustrative purposes only and is not meant to imply a required order, unless otherwise specified. Moreover, any phrasing or characterization of a step, component, system, or other element as being necessary is merely with respect to a particular embodiment, and should be understood as merely being optional and/or useful for a particular embodiment or approach.

Various systems and methods for evaluating an assessment, such as a quiz, may include displaying a first challenge problem of an assessment to an assessor, such as an instructor of students. The first challenge problem may include one or more answers previously provided by an assessee, such as a student. For example, an assessee may have answered the challenge problem by providing one or more digital ink stroke answers, a draggable object answer, and/or an annotation answer. In various embodiments, the challenge problem may include an image, a text, or the like and the digital ink stroke answer, draggable object answer, and/or annotation answer may be provided with respect to the image, the text, or the like.

The method may include displaying the challenge problem and/or the answers provided by the assessee for the assessor to assess. The assessment by the assessor may be in the form of a feedback tag that is associated with the assessee answer. In such embodiments, the assessor may thereby create assessor answer items during the grading process. In contrast, in some embodiments, the assessor may create assessor answer items outside of the context of grading assessee answer items.

An assessor may provide a feedback tag that is associated with an assessee's answer to a challenge problem of an assessment. As a specific example in a traditional test scenario, a professor may provide a numerical grade with a feedback item that is associated with a student's answer to a specific test question.

In some embodiments, a system may sequentially present an assessor with answers to a challenge problem from each of a plurality of assessees. Such a system may require the assessor to individually assess answers from each of the plurality of assessees for each challenge problem in a set of challenge problems.

As described above, an assessor may provide a feedback tag for a first answer provided by an assessee to a challenge problem of an assessment. The system 100 or a portion of the system, such as the matching algorithm 150 and/or the grading system 170, may compare answers provided by other students to the same challenge problem with the answer(s) that have already been assessed and tagged by the assessor with a feedback tag.

The system may automatically tag matching answers with the same or similar feedback tag. In some embodiments, matches may only be considered valid if a confidence level of the match is above a predetermined threshold value. In various embodiments, the assessor may not need to review or provide feedback to answers that have already been tagged automatically based on matched answers. Thus, the system may reduce the difficulty and/or the time required to assess, and provide feedback for a large number of assessees.

As a specific example, an instructor may administer a test that has 10 questions, each of which requests that a student provide an answer item in the form of a digital ink stroke, a draggable object answer, and/or an annotation answer. The instructor may administer the test to, for example, 90 students. The instructor may then have to provide an assessment of each of the 900 answers.

According to various embodiments of systems and methods provided herein, a system may present a first answer to a first question from a first assessee to an assessor for assessment. The assessor may provide a feedback tag (e.g., a grade, numerical value, comment, etc.) that is then associated with the first answer. The system may identify one or more answers to the first question from one or more of the other assessees that match (e.g., is similar or identical to) the tagged first answer from the first assessee.

Each of the matched answers may be automatically tagged with the same or similar feedback tag as was manually provided for the first answer by the assessor. The matched and automatically tagged answers may be removed from the review queue of the assessor, reducing the number of answers that must be manually assessed by the assessor.

Figure 2:
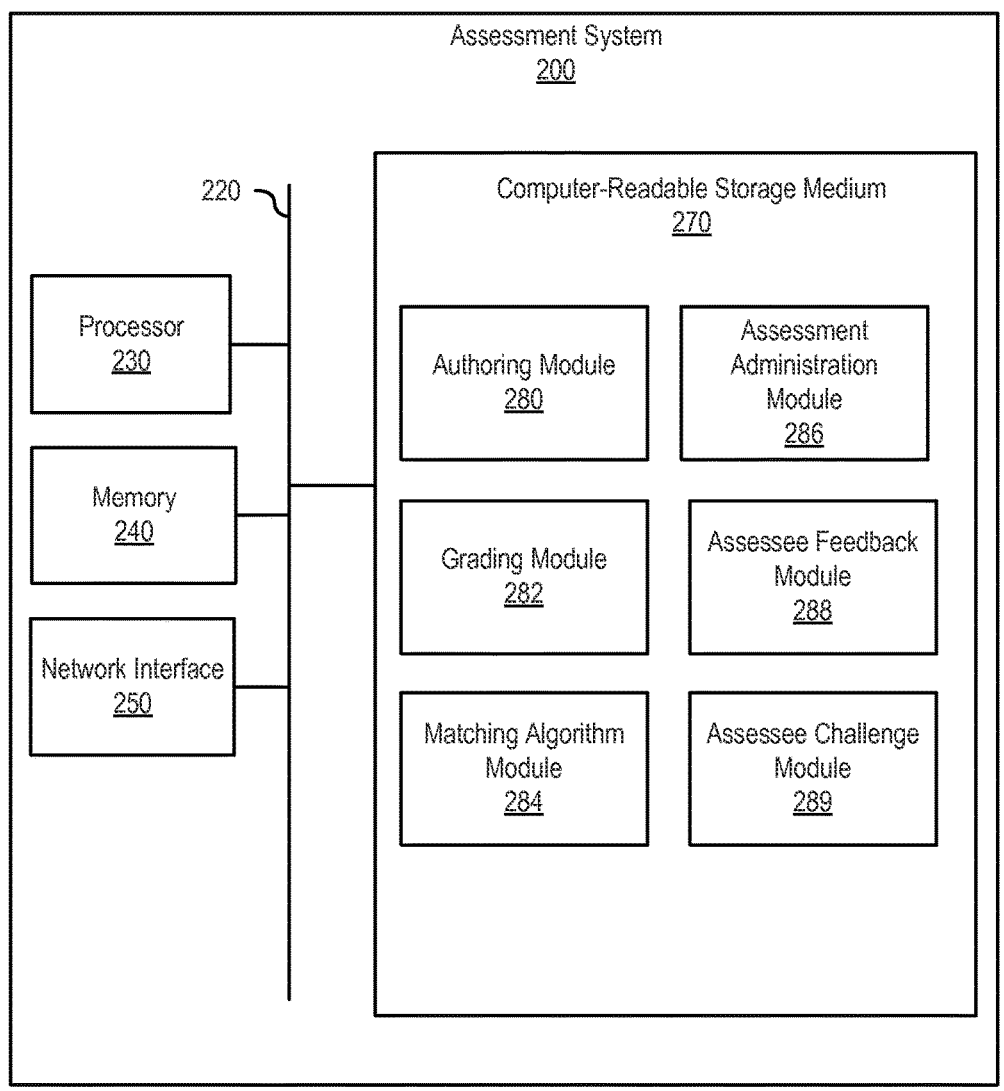
FIG. 2 is a functional block diagram of one embodiment of a computer system for facilitating the authoring, administration, and/or assessment of an assessment.

FIG. 2 is a functional block diagram of one embodiment of a computer system 200 for facilitating the authoring, administration, and/or assessment of an assessment. As illustrated, a processor 230 may be in communication with a memory 240, a network interface 250, and/or a computer-readable storage medium 270 (e.g., a non-transitory computer readable storage medium) via a bus 220. The computer-readable storage medium 270 may include or be in communication with one or more modules 280-289 implemented in hardware, firmware, and/or software. Thus, while each of the modules 280-289 may be implemented as computer-executable instructions within a computer-readable medium, each of the modules may alternatively and/or additionally be implemented in hardware or firmware in whole or in part.

In various embodiments, one or more of the illustrated modules 280-289 may be removed and/or implemented by a different system at a later time or concurrently. In some embodiments, some of the method steps and/or modules may be omitted. It is appreciated that division of modules may be further divided into sub-modules and/or tasks may be combined resulting in fewer total modules. Additionally, the tasks of some modules may be performed remotely, manually, and/or not at all.

As described herein, an authoring module 280 may allow assessors to create one or more challenge problems suitable for presentation to an assessee through a particular assessment system. A challenge problem may include a solicitation for a digital ink stroke answer, a draggable object answer, and/or an annotation answer. The challenge problem may be answered by an assessee via a digital input.

The authoring module 280 may also allow the assessor to create one or more assessor answers and/or feedback tags to be used in evaluating assessee answers. The one or more assessor answers and/or feedback tags may include one or more feedback tags to be associated with each assessee answer item that matches an assessor answer item. As described herein, assessor feedback tags may be provided by the assessor out of the context of grading assessee answer times.

For example, an assessor may provide correct, incorrect, and/or alternative answer items to one or more challenge problems and indicate an appropriate feedback tag for assessee answer items that match the assessor answer items. Alternatively, assessor answer items may be effectively created as the assessor grades, annotates, and/or otherwise associates feedback tags with assessee answer items. In various embodiments, a set of assessor answers may be actually created. In other embodiments, a set of assessor answer items is created/stored in that there exists a set of assessee answer items that has been tagged.

A grading module 282 and a matching algorithm module 284 may identify and/or grade assessee answer items by identifying matching answer items that have already been evaluated by an assessor. The grading module 282 and matching algorithm module 284 may perform any of the functions or steps described in conjunction with any of the embodiments and permutations of the embodiments described in conjunction with FIGS. 1A and 1B, especially grading system 170, graded matches 190, matching algorithm 150, and potential matches 160.

An assessment administration module 286 may administer an assessment to one or more assessees. Each assessment may include any number of challenge problems that may each be answered via one or more assessee answer items. Each assessee answer item may include traditional answer items (e.g., multiple choice bubbles), digital ink stroke answers, draggable object answers, annotation answers, and/or other answer types. In some embodiments, some of the challenge problems may be graded according to the systems and methods described herein while others may require manual grading. For example, an assessment may include various challenge problems that can be answered via digital ink strokes as well as one or more challenge problems that solicit, for example, an essay answer that is intended to be read and manually graded by the assessor.

An assessee feedback module 288 may provide the assesse with feedback regarding an assessment after or while it is being evaluated by an assessor and/or via an automated assessment process (e.g., matching assessee answer items with assessor answer items). Alternatively, the assessee feedback module 288 may provide feedback tags associated with one or more of the assessee's answer items that matched tagged assessor answer items (e.g., explicitly provided assessor answer items or other assessee answer items manually tagged by the assessor). The assessee feedback module 288 may perform any of the various functions or method steps described in conjunction with the assessee feedback system 180 in FIGS. 1A and 1B.

An assessee challenge module 289 may allow assessees to challenge one or more grades, feedback tags, or other commentary provided by the system and/or the assessor. An assessee may indicate which challenge problem, assessment, answer item, or other information regarding an assessment that the assessee disputes. The disputed item may be escalated for review by the assessor or a dispute resolution person or entity, and/or otherwise be given a second review. In some embodiments, disputes may only be made for challenge problems and associated answer items that were automatically graded based on a matching answer item. That is, if an assessor manually graded an assessee answer to a challenge problem, it may not be disputable via the assessee challenge module 289.

The computer-readable storage medium 270 may include any number of additional modules implemented in software, hardware, and/or firmware to perform any of the various method steps or functions, and/or otherwise implement a system component described herein. For example, each of the described components in FIGS. 1A and 1B may be embodied as a module within computer-readable storage medium 270.

Figure 3:
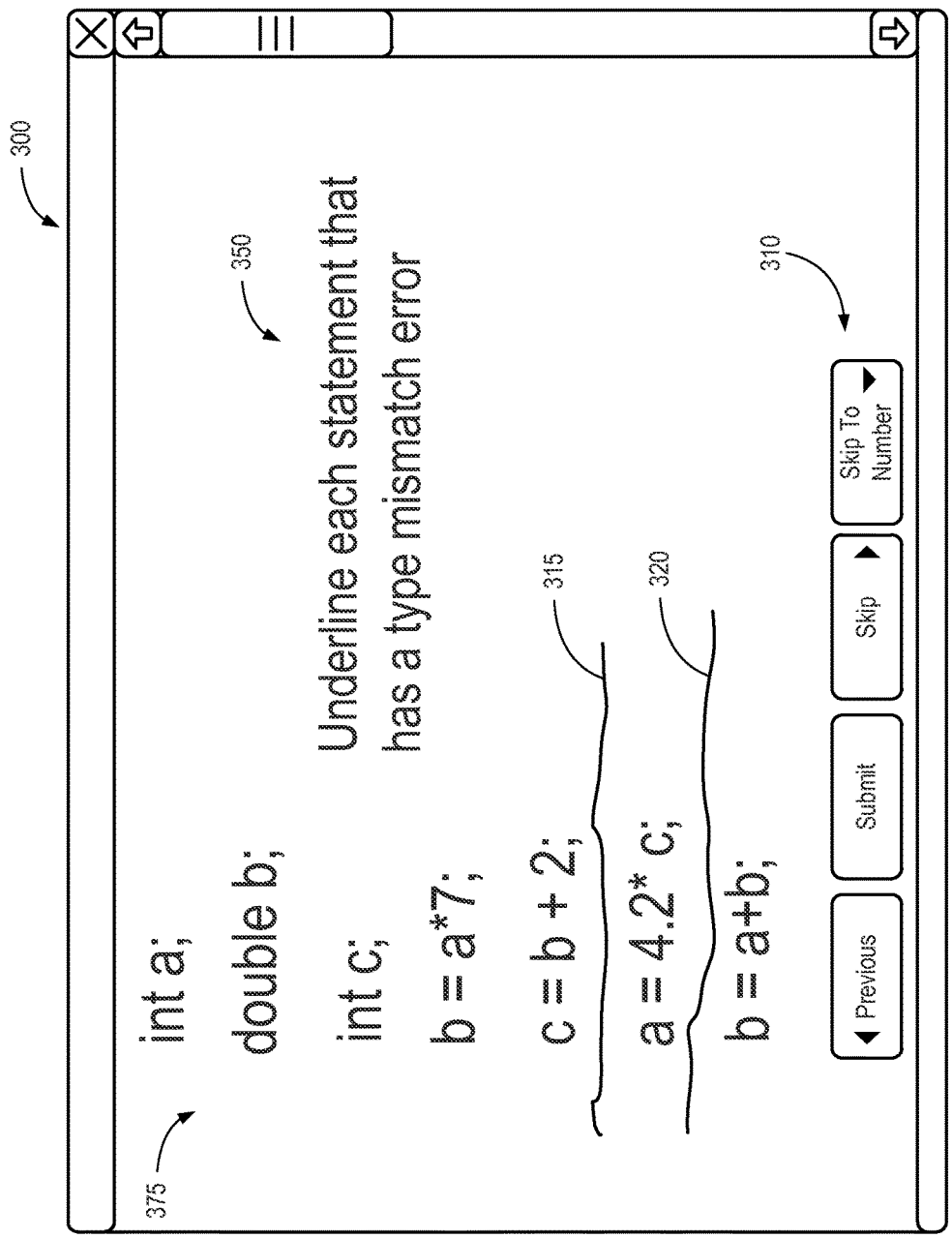
FIG. 3 is a representation of a graphical user interface (GUI) presenting another challenge problem that can be answered via a digital ink stroke.

FIG. 3 is a representation of a graphical user interface (GUI) 300 presenting another challenge problem 375 that can be answered via a digital ink stroke. Such a challenge may be referred to as a digital ink problem. A digital ink problem may be a gradable problem that includes drawings and/or instructions 350. The instructions 350 may contain a question or instruct assessees as to the task the assessee is to perform. In various embodiments the instructions 350 may be embedded in the problem drawing or provided separately. Instructions 350 may be any combination of text, image, drawing, video or audio. The instructions 350 may indicate that different stroke colors are to be used for different types of answers. Buttons or other links 310 may be provided in the GUI 300 to navigate between challenge problems in an assessment containing multiple challenge problems.

In the illustrated embodiment, the challenge problem 375 includes a program fragment and the instructions 350 ask the assessee to underline all syntax errors (e.g., type mismatch errors). In another embodiment, the assessee may be asked to underline, circle, draw a box, draw a polygon, and/or make another marking to indicate which of a plurality of expressions are the source of a particular value.

The assessee may answer or work a problem by interactively providing one or more digital ink strokes 315 and 320 over the top of the problem (e.g., the image, text, etc.). Each such digital ink stroke 315 and 320 may be, at least a part of, an assessee answer item within the digital ink problem system. The digital ink strokes 315 and 320 can be created with a mouse, on a touch screen, with a stylus or via any other interactive device that allows the student to generate a sequence of points or a continuous line, segment, or other marking to form a digital ink stroke. The system may also allow the digital ink stroke to be made in any of a variety of colors, patterns, line widths, etc. Digital ink strokes are referred to herein interchangeably as simply "strokes."

There are a variety of ways in which a digital ink problem system can be used to create educational problems. For example, many elementary school exercises consist of matching words to pictures of objects by drawing a line between the word and the matching picture. The list of words and the pictures may be embedded in the problem's drawing or image. The instructions may instruct the student to draw ink strokes between words and corresponding pictures. The student's answer items may be the digital ink strokes provided to connect the words and the images. Similarly elementary school problems can show text or images and ask students to circle items that match some criteria. The problem is in the drawing and the answers are the circle strokes.

As another example in a visual design context, a challenge problem may include a problem in the form of a drawing of an example visual design and include instructions soliciting that the assessee identify all alignment problems. The assessee may work this problem by drawing lines where things are out of alignment and/or provide other digital ink strokes to complete or fix the design.

As another example, in the context of an electronic circuits assessment, a challenge problem may include a set of electronic part symbols along with a particular problem to be solved. The assessee may answer by drawing strokes that connect the outputs of some parts to the inputs of others. The result is a circuit that hopefully solves the problem. The answer is embodied in the set of digital ink strokes connecting the circuit parts.

The above examples provide possible problems that might be created and answered in a digital ink problem system. A wide diversity of subject matter may be posed as a problem within a digital ink problem system. Accordingly, the examples provided above are merely illustrative, and a wide variety of subjects and problems may be addressed and answered with one or more digital ink strokes, many of which may be graded or otherwise evaluated in an automated fashion.

In the context of digital ink strokes, the authoring system described herein (see, e.g., the description in conjunction with FIGS. 1 and 2) may be adapted for: (1) creating or acquiring the background drawing for the problem; (2) creating the problem instructions (possibly empty); (3) creating zero or more correct ink strokes along with any associated feedback (possibly provided in the context of grading assessee answer items); (4) creating zero or more incorrect ink strokes along with any associated feedback and score (again, possibly provided in the context of grading assessee answer items); and (5) selecting a scoring rule from a set of scoring rules and/or creating a customized scoring/feedback rule.

The problem drawing can be acquired from any source including a camera, the internet, a scanner or any other device that can generate an image or a drawing. The drawing may also be created by assembling various drawing and text primitives as when creating, for example, a PowerPoint slide or an Adobe Illustrator drawing.

The instructions may be embedded in the background drawing, acquired from some other source or created by the assessor using any combination of text, image, drawing, video and/or audio. A digital ink authoring system need not support all of these combinations, but may in some embodiments. In some embodiments, some or perhaps one of these forms may be used for a digital ink authoring system.

New correct assessor answers and/or feedback tags may be interactively created as digital ink strokes over the background drawing by the assessor. Alternatively, the assessor may not make any actual digital ink strokes, but rather create assessor answer items by providing feedback on existing assessee answer items from completed challenge problems. As contextually provided herein, an assessor answer item may include an answer and/or a feedback tag. In various embodiments, the assessor answer item is an assessee answer item that has been tagged by the assessor with feedback. Thus, a training set may include (1) answers explicitly created by the assessor and associated with a feedback tag and/or (2) assesse answers that have been tagged by an assessor with a feedback tag.

The authoring system may allow scoring information to be added to the stroke. In addition, the authoring system may allow for the creation of digital media as feedback on that item. The feedback may be based on the fact that a digital ink stroke of an assessee matches a correct assessor digital ink stroke, in which case the feedback may be positive. Another type of possible feedback is if there is no assessee digital ink stroke provided in the context of a particular challenge problem that matches a correct assessor digital ink stroke for the same challenge problem, in which case the feedback may be negative, corrective, and/or remedial. As described herein, the system may make providing correct assessor answer items optional and/or let assessor answer items be created as part of the grading process. In various embodiments, matching assessee digital ink strokes with assessor digital ink strokes may not be based on correct or incorrect answer items, but rather simply include identifying the matches and providing associated feedback—negative, positive, neutral, instructional, etc.

Figure 4:
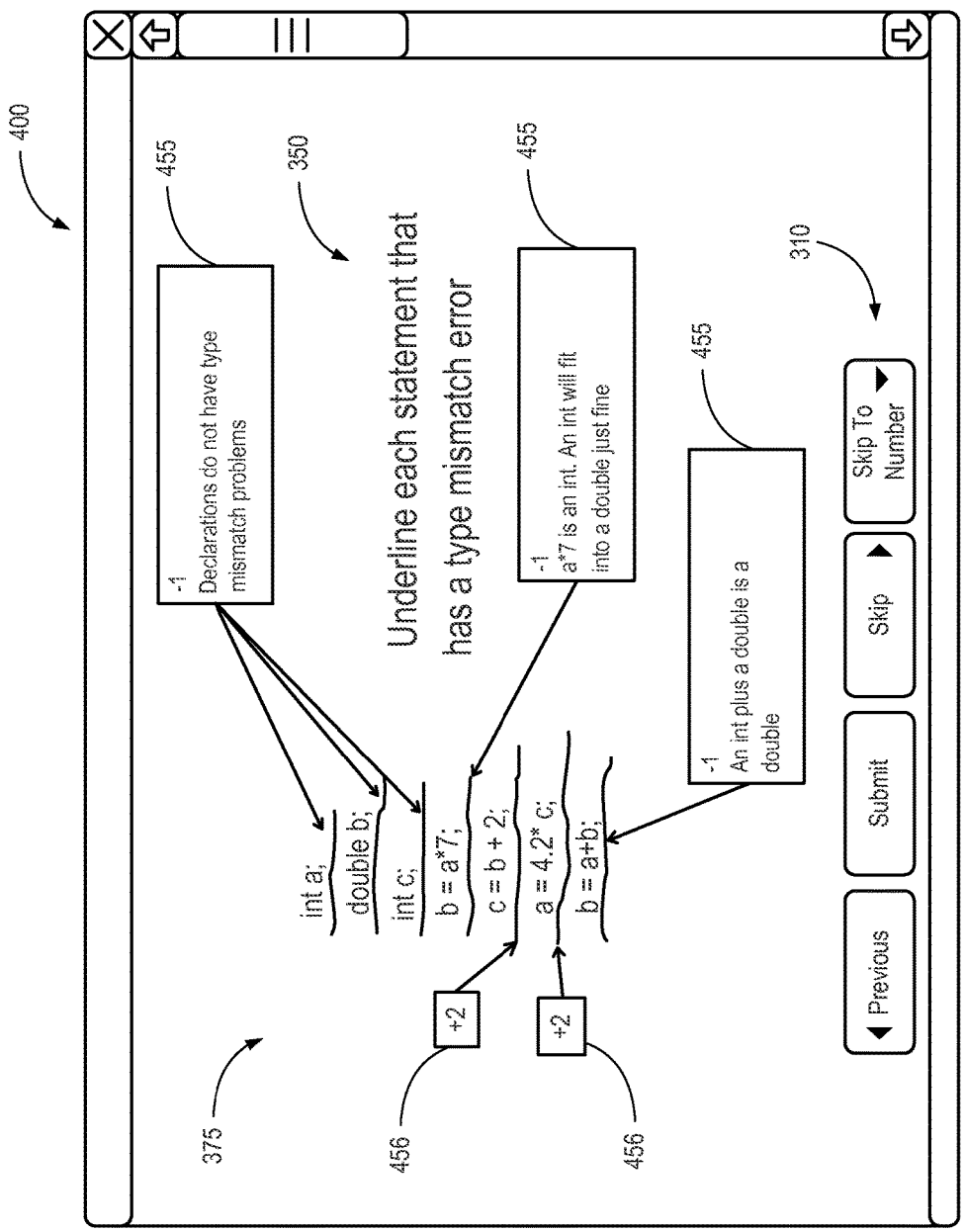
FIG. 4 is a representation of a GUI configured to facilitate an assessor tagging one or more digital ink strokes that may be possible answers to the challenge problem in FIG. 3.

FIG. 4 is a representation of a GUI 400 configured to facilitate an assessor tagging one or more digital ink strokes that may be possible answers to the challenge problem in FIG. 4. As illustrated, the authoring system may allow an assessor to create incorrect digital ink strokes (the first four and the last digital ink strokes on the challenge problem) and provide an associated feedback tag 455. An assessor may also provide feedback tags 456 for the two correct digital ink strokes. As previously described, the assessor may explicitly create each of the digital ink strokes illustrated in FIG. 4 to create correct and incorrect assessor digital ink strokes in the context of the challenge problem 375. Alternatively, the assessor may create tagged assessor digital ink strokes during the grading process by tagging and/or otherwise providing feedback tags for assessee answer items.

The assessor may also select a scoring rule for each challenge problem. In some systems there may be a single default scoring rule supported by the system, in which case selection by the assessor is not required. In other embodiments, the assessor may create custom feedback or scoring rule to be utilized for one or more of the challenge problems for a particular assessment.

Figure 5:
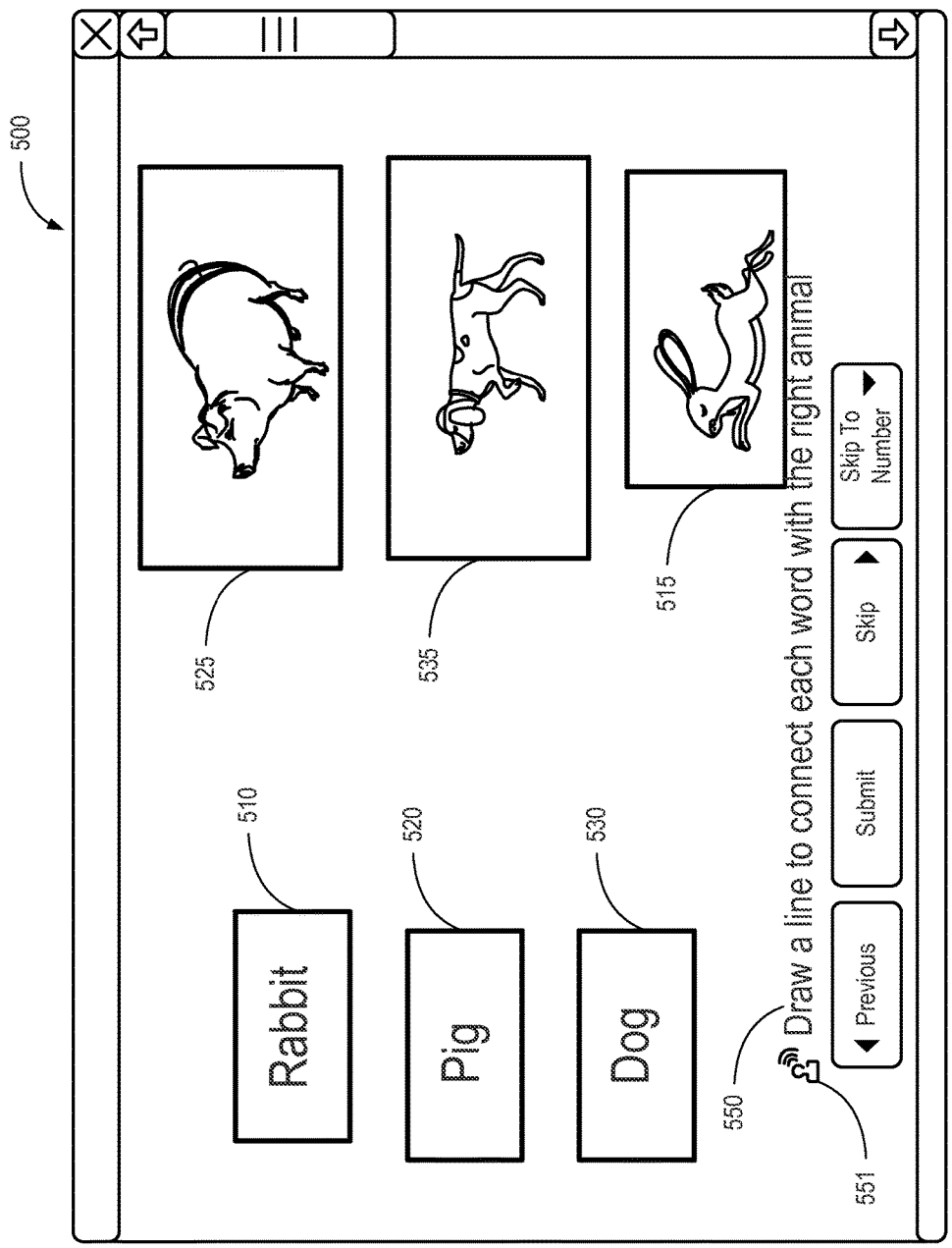
FIG. 5 illustrates one representation of a GUI with identified regions of interest of a challenge problem useful for determining a digital ink stroke answer, a draggable object answer, and/or an annotation answer.

FIG. 5 illustrates one representation of a GUI 500 with identified regions of interest 510, 520, 530, 525, 535, and 515 of a challenge problem and associated instructions 550. In the illustrated embodiment, the instructions 550 can be heard via audio by selecting the audio icon 551. The regions of interest 510-535 may be useful for determining a digital ink stroke answer, a draggable object answer, and/or an annotation answer. As illustrated, the assessor may identify regions of the image 510-535 as being important. This will aid the matching algorithm in generating useful features. The assessor may not be required to create features, or even to understand the matching algorithm. By way of example, a "feature" or "characteristic" of a digital ink stroke that can be used for matching may be end points of a segment, line, curve, etc. located within the regions of interest 510-535.

For instance, while an assessor digital ink stroke may connect rabbit 510 with the picture of the rabbit 515 via a straight line, the features used for matching may simply be the beginning and end points of the digital ink stroke. Thus, an assessee answer item that squiggles around the page may be considered a match so long as the features are matched (e.g., the beginning and end points of the digital ink stroke are within the same region).

FIG. 5 shows the regions of interest 510-535 as rectangles. A region of interest can be any closed shape or region, such as rectangles, curves, polygons or digital ink strokes.

Figure 6:
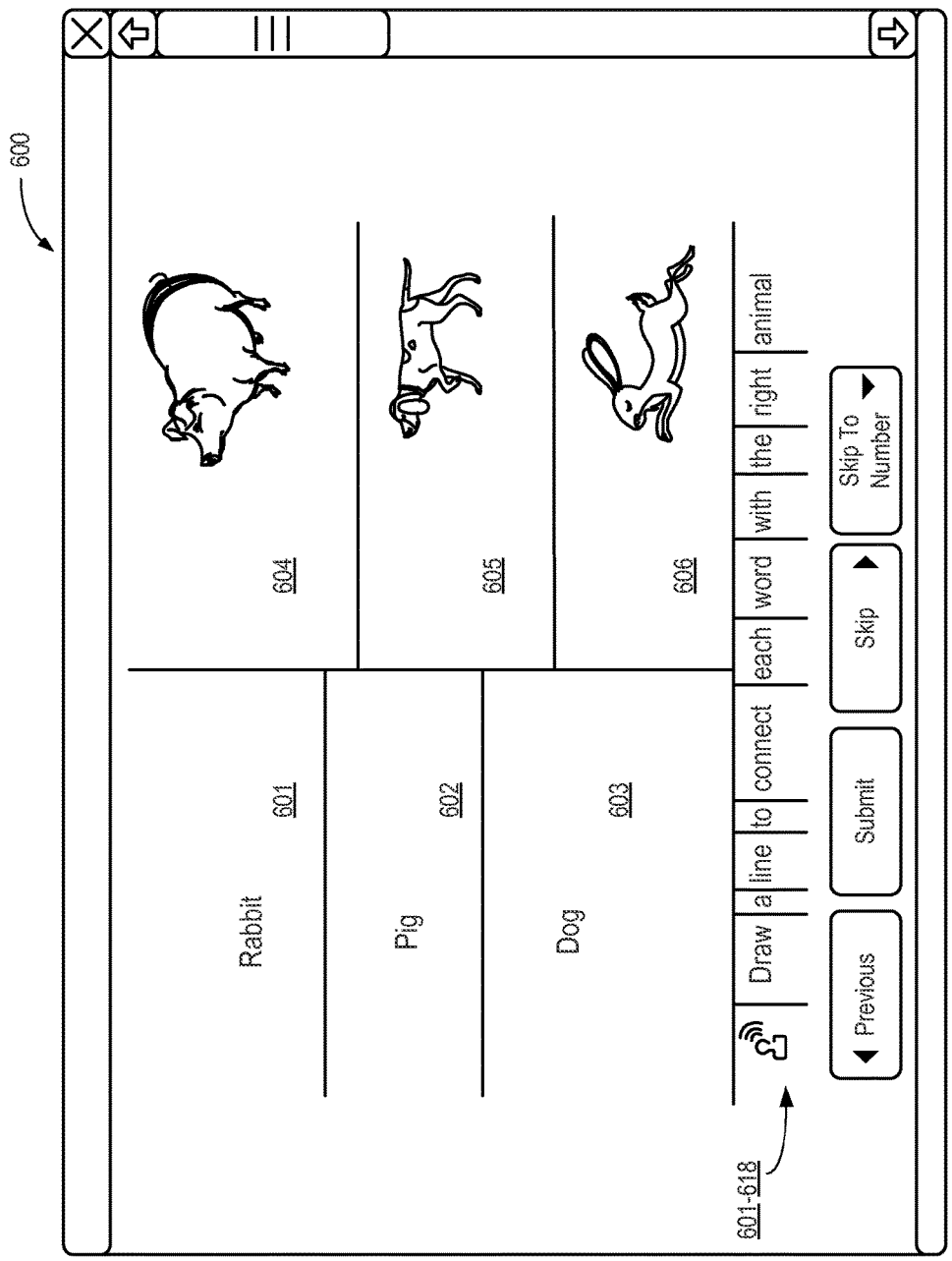
FIG. 6 illustrates another representation of a GUI with identified regions of interest of a challenge problem useful for determining a digital ink stroke answer, a draggable object answer, and/or an annotation answer.

FIG. 6 illustrates another representation of a GUI 600 with identified regions of interest 601-618 of a challenge problem useful for determining a digital ink stroke answer, a draggable object answer, and/or an annotation answer. As illustrated, the system may automatically decompose the challenge problem and/or instructions into component parts. Such an algorithm may result in regions that can be used to determine features for the matching algorithm.

As described herein, the matching algorithm may compares two digital ink strokes to compute a distance metric between them. The points of the strokes can be compared directly using Dykstra's algorithm or a greedy algorithm, as described in one or more of the publications cited above and incorporated by reference herein.

A direct comparison of a distance between strokes can be used as the basis of a matching algorithm. Alternatively, a predefined set of features may be compared using a distance metric. The matching algorithm may not compute a vector of features from the strokes, but it may nevertheless determine matching digital ink strokes with a sufficient confidence level.

In some embodiments, the system may compute a vector of features from each digital ink stroke. This may be useful, for example, to drive a machine learning and matching algorithm(s). There are a variety of features that can be used to compare two strokes. For example, an effective feature set may be made using start and ending points, angles, or curves, and/or various stroke length measures. In some embodiments, the system may utilize starting and ending points as well as N−2 equally spaced points sampled from one of the digital ink strokes for comparison with another digital ink stroke. Using the X and Y values of the N points yields N*2 features for matching. For many of the example cases, the start and end points are sufficient features, as well as the X and Y bounds of the stroke points. These and other characteristics of the digital ink strokes can be used to create feature sets for use in a machine learning and matching algorithm used in the automatic grading system.

If regions of interest, such as those discussed in conjunction with FIGS. 5 and 6, in the challenge problem are either automatically created or manually indicated by the instructor, they can be used to generate new features. Stroke features might have a feature for the region that it starts in and/or the region that it ends in. There might also be stroke features for whether a stroke passes through a particular region. If we number the regions as a stroke passes through, the number for each region could also be a feature that captures the order of the stroke's passage. There are other potential stroke features that might be derived from regions of interest.

The grading system may correct errors committed by the automatic grading system and possibly enrich the training examples for the matching algorithm and/or the feedback information provided to assessees. A grading instance used by the grading system may include a challenge problem (from the authoring system) which may include a background drawing and an optional question or problem statement, referred to herein in some instances as instructions. Such questions, problem statements, and/or instructions may embody a solicitation for a digital ink stroke in one form or another.

An assessor answer may include one or more digital ink strokes as examples coupled with scoring information or another feedback tag for one or more answer items. This may be augmented or created by the assessor during the evaluation (e.g., the grading process) of the assessee's digital ink strokes.

An instructor answer item may include one or more digital ink strokes generated by the assessee and tagged with a feedback tag by the assessor.

The matching algorithm may identify digital ink strokes that match an assessor digital ink stroke (including assessor-tagged digital ink strokes made by other assessees during the grading process). The matching algorithm may also identify digital ink strokes that do not match an assessor digital ink stroke.

The grading system may present the assessor with the results of the automatic grading generated by the matching algorithm for evaluation. The grading system may also allow the assessor to correct the results of the matching algorithm to provide a more accurate evaluation of the assessees' work. The grading system may present all of the information in the grading instance in a form that is easily evaluated by the assessor, e.g., in sets, in groups, sequentially, etc.

In one embodiment, the assessor may be presented (e.g., via a display) with a challenge problem and an overlay of all assessee strokes and all assessor strokes. In some embodiments, as the grading process develops there may be an increasing number of instructor strokes either from digital ink strokes explicitly created by the assessor via, for example, the authoring system, or generated by the grading system for previous grading instances of assessee-created digital ink strokes. Accordingly, one approach is to remove all strokes belonging to incorrect instructor items that do not match any assessee strokes. There may be lots of these and if they do not match assessee strokes, they are usually irrelevant to grading a given assessee's work.

Another approach is to display only one of the strokes associated with the matching assessor answer item. For example, the system may display the assessor stroke that is closest to the assessee stroke. The assessor selecting the best stroke to display from all of the strokes in the answer item would be another alternative. This may thin out the strokes displayed to those that are more meaningful.

Another approach may include identifying matches made with a confidence higher than some threshold. The assumption is that these results are correct and may not need any further assessor evaluation. All assessee and assessor strokes corresponding to these high confidence cases can be removed from the display. This focuses the assessor's attention on those strokes where the matching algorithm may need further input from the assessor or an evaluator designed or otherwise associated with the assessor.

In some embodiments, the assessor may adjust the confidence threshold for which assessee digital ink strokes are displayed. Displayed digital ink strokes may each be associated with a displayed confidence level or color-coordinated for particular confidence levels. Confidence level markings could at a quick glance show the assessor where the threshold is relative to the answer items in this grading instance. The assessor may also be presented with a list of answer items sorted in confidence order. This list would display the feedback or summary of the feedback for each match. This list can be used to set the confidence threshold for display. The assessor may also click, press or otherwise select the feedback from one of the assessor answer items to temporarily show its corresponding assessee and assessor strokes in the overlay. This would allow the assessor to selectively view specific items as needed.

Another approach includes showing only items from one of the Case 1, Case 2, Case 3, and Case 4 situations described above. This may reduce the number of answer items (e.g., digital ink strokes) to be displayed and focuses the assessor's attention to the particular kind of grading decision that has been made by the matching algorithm and that perhaps needs adjustment by the assessor. A variation on this approach is to show all cases but each in its own window so that the assessor can readily see all of the cases but they are separated for clarity. Another variation is to show an interactive confidence control with markings (as described in the previous paragraph) for each case. This could be used by the assessor to quickly decide which cases should be viewed and considered.

Each of these approaches and its variations could be used in combination with some or all of the others. That is, the approaches are not necessarily mutually exclusive. The assessor may be given the interactive ability to enable or disable each of the options to create custom views of grading instances.

One view would be all of the assessee strokes plus a representative assessor stroke for each instance of a Case 4 match (where there is no matching assessee stroke). This particular view shows all of the strokes that should be considered for grading. It may not contain information about alternative strokes or matching, but it may show every stroke to which a score and/or feedback should or could be attached. Such a view may be referred to as a "grade feedback view."

Figure 7:
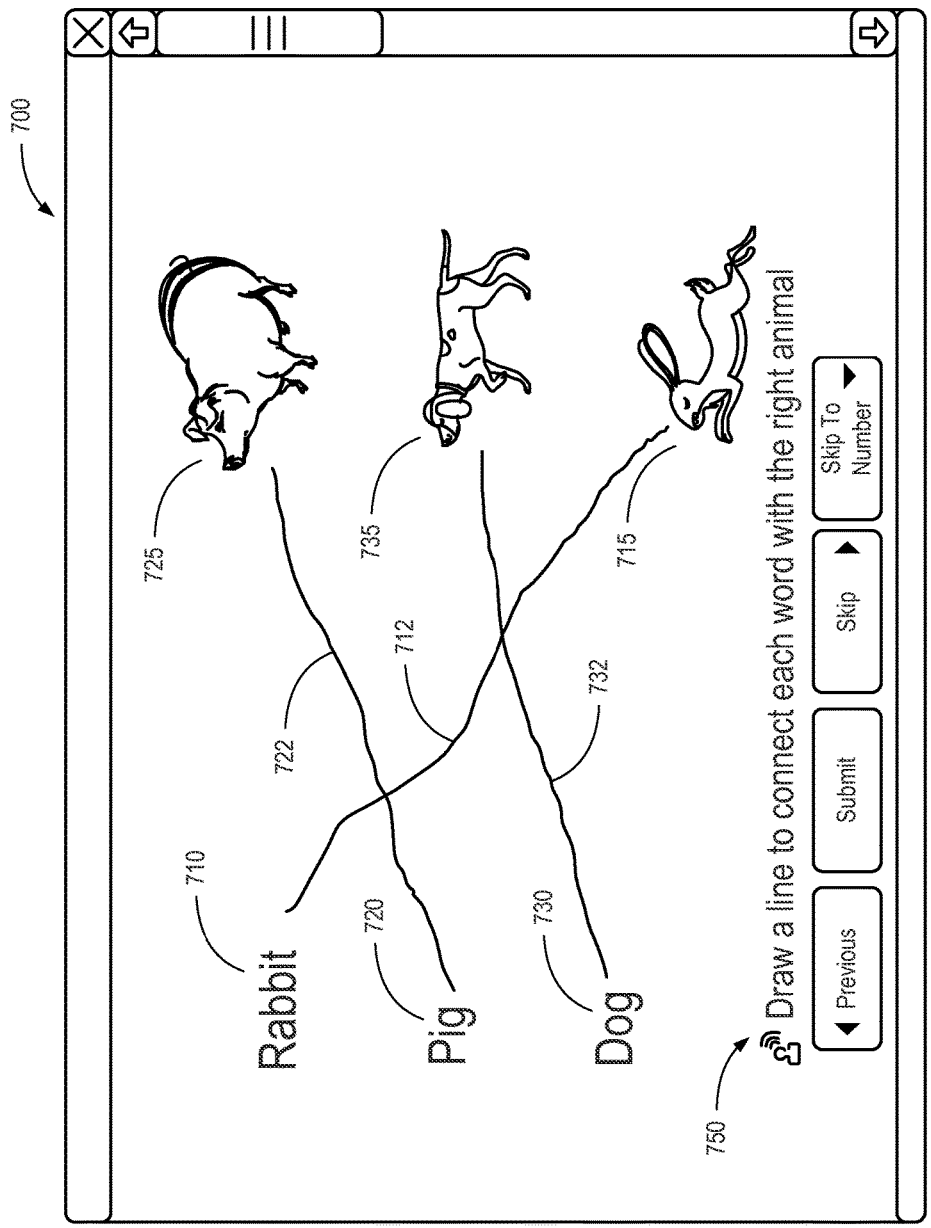
FIG. 7 is a representation of a GUI with digital ink stroke answer items overlaying a challenge problem.

FIG. 7 is a representation of a GUI 700 with digital ink stroke answer items 712, 722, and 732 overlaying a challenge problem. As described in previous embodiments, instructions 750 may solicit one or more digital ink strokes from an assessee, including correct digital ink stroke 712 connecting Rabbit 710 with rabbit icon 715; correct digital ink stroke 722 connecting Pig 720 to pig icon 725; and correct digital ink stroke 732 connecting Dog 730 with dog icon 735.

Figure 8:
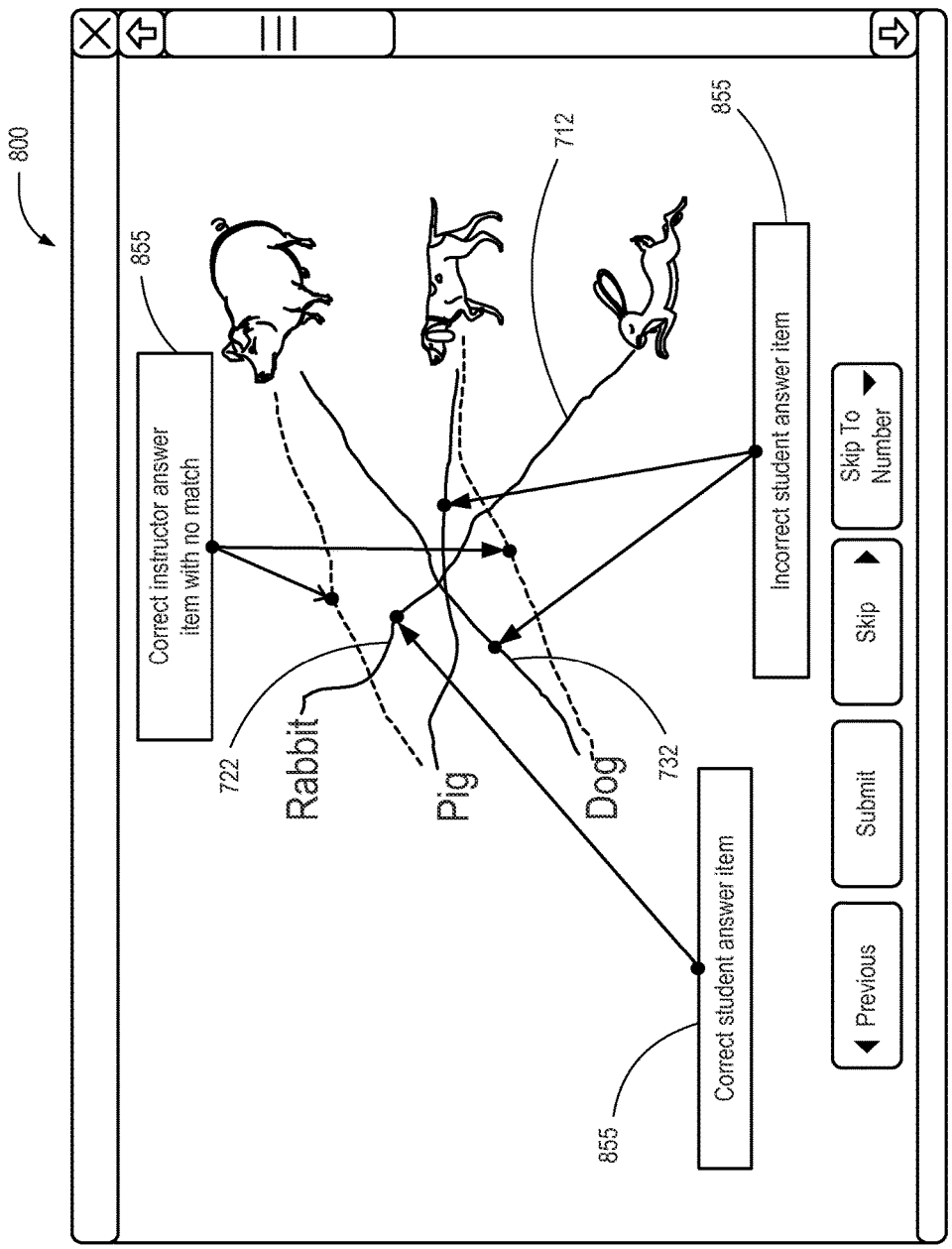
FIG. 8 illustrates several possible digital ink strokes on the challenge problem of FIGS. 5-7.

FIG. 8 illustrates several possible digital ink strokes on the challenge problem of FIG. 7 in a grade feedback view 800, as described above. As illustrated, in addition to seeing the digital ink strokes made by the assessee, the assessor can also see the correct assessor digital ink strokes and associated feedback that will be provided to the assessee. That is, the assessor is able to view, edit, and/or assign feedback tags to the digital ink strokes. In some embodiments, a total score for the problem can be displayed as well. Any of the views described above can be used for displaying feedback and scoring. As illustrated, the assessee's digital ink strokes (e.g., 712) are displayed. Feedback tags 855 are displayed for one or more of the assessee's digital ink strokes and/or missing correct digital ink strokes. A similar presentation may be provided for the assessee's final review.

Figure 9:
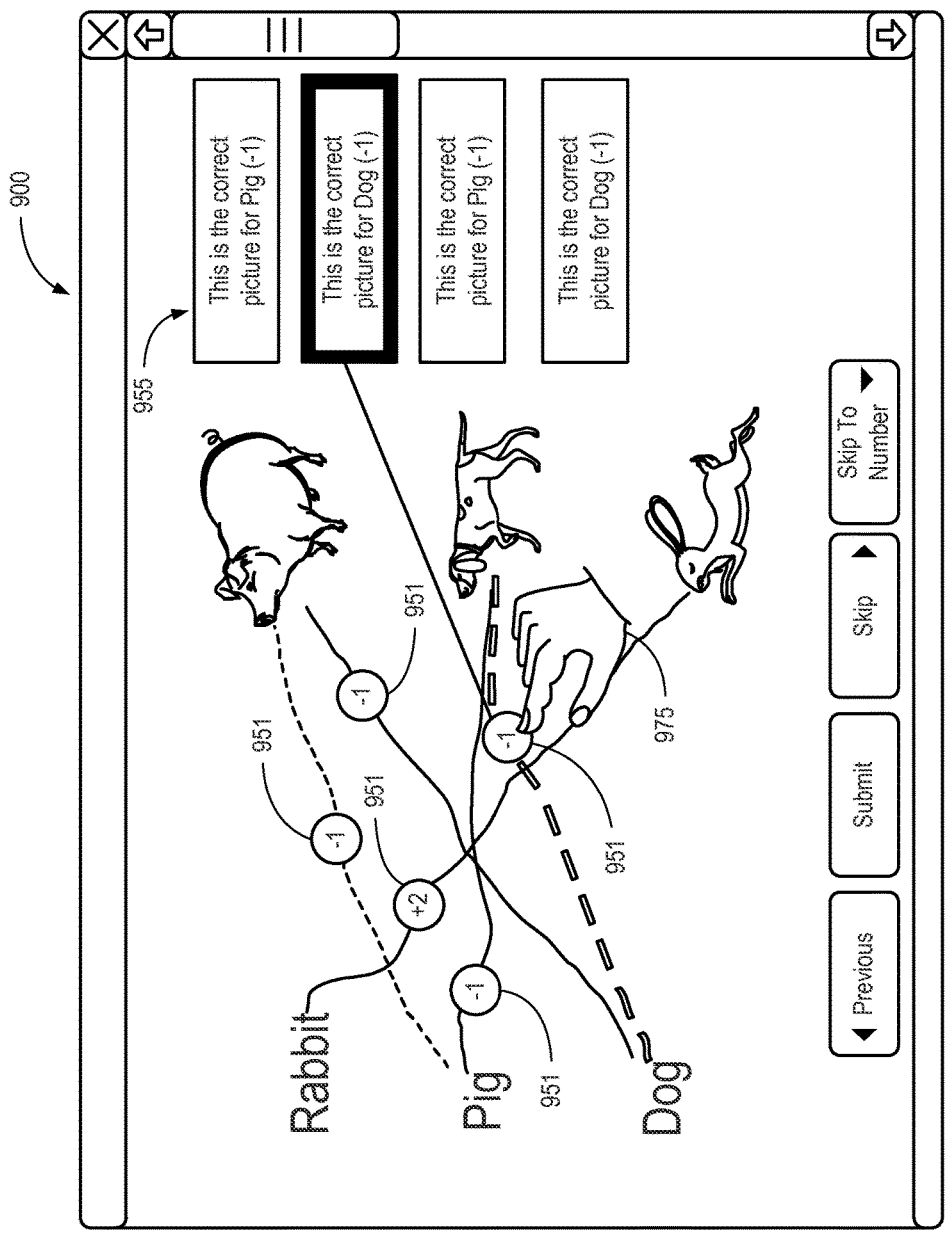
FIG. 9 illustrates one or more feedback tags associated with several digital ink strokes on the challenge problem.

FIG. 9 illustrates one or more feedback tags 951 associated with several digital ink strokes on the challenge problem. As illustrated, the feedback tags 951 may include or be associated with feedback comments 955 that may be displayed 900 in an area adjacent to the grading view of FIG. 9. The assessor may select, at 975, any stroke being displayed in the grading view and may also have the feedback from corresponding assessor answer item highlighted. The assessor may also select any feedback and have the corresponding strokes highlighted in the grading view.

A possible highlight is to show a line and/or arrow connection between selected strokes and their feedback. A variation would be to display all lines and/or arrows from feedback information to corresponding strokes. Another approach is to show a mark next to any stroke in the grading view that has associated feedback. Selecting the mark would cause the corresponding score/feedback information for that stroke to appear.

Figure 10:
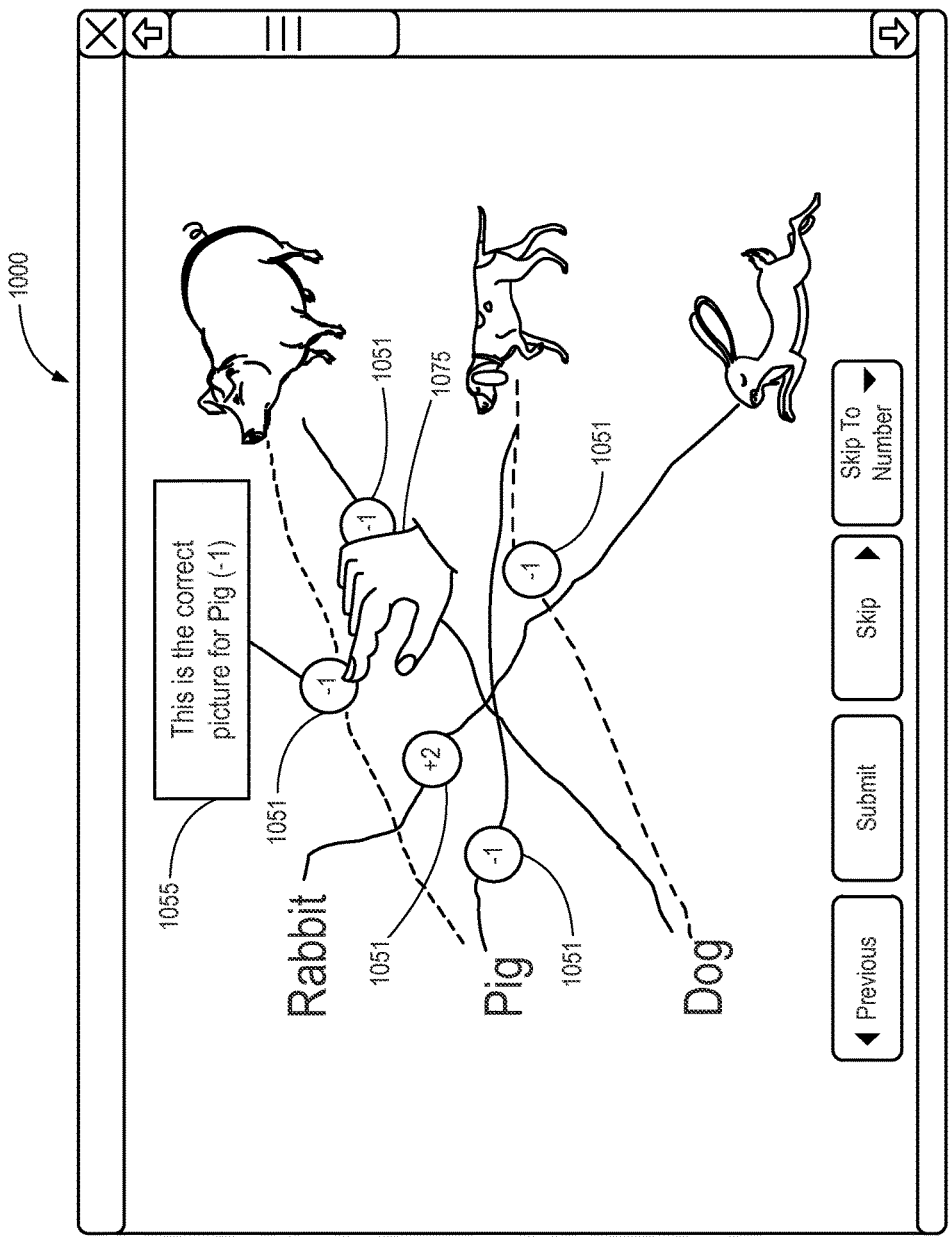
FIG. 10 illustrates one or more feedback tags associated with several possible digital ink strokes on the challenge problem.

FIG. 10 illustrates one or more feedback tags 1051 associated with several possible digital ink strokes on the challenge problem. As illustrated, at 1000, feedback comments 1055 for a selected, at 1075, digital ink stroke may be displayed outside the grading view or proximate the selected stoke.

As previously described, corrections may be provided by the assessor when the matching algorithm has inappropriately classified assessee strokes in some way.

In some embodiments, the assessor may initiate a correction by selecting an assessee stroke. When the stroke is selected, the corresponding feedback may be either highlighted or made visible or both. The assessor may change the feedback associated with the selected stroke. When a stroke is selected for correction, feedback for all existing assessor answer items for this problem may be displayed. The assessor may initiate a correction by selecting one of these other pieces of existing feedback information. When presenting feedback from other potential assessor answer items, these other items may be sorted by how closely their example strokes match the stroke being corrected. This sort order will assist by showing feedback from likely matching assessor answer items first. When the assessor selects a different assessor answer item for a stroke, the assessee stroke may be added to that assessor answer item as a new example to be used to train the matching algorithm.

It may be that an appropriate assessor answer item for the currently selected assessee stroke does not yet exist. In this case the grading system allows the assessor to create a new assessor answer item using a similar user interface to the one used in the authoring system. This new assessor answer item takes the selected assessee stroke as its first example, and the new assessor answer item is added to this problem for future use.

If a correct assessor answer item is not matched by any of the assessee strokes, it could be an error if there actually is an assessee stroke that should match this answer item. This can be corrected by identifying the correct matching stroke, either an assessor digital ink stroke explicitly made by the assessor or another assessee digital ink stroke already tagged by the assessor. The matching stroke may be added as a training example to the assessor's answer item, and that assessee stroke acquires the new score and feedback of that answer item.

As corrections are made in the assignment of assessee strokes to assessor answer items, the training examples for the matching algorithm may be changed/updated. Assessee strokes are added as new training examples. This may cause the algorithm to change the way it classifies previously graded instances of this problem for other assessees. These previous grades may benefit from additional assessor review; however, it may not be desirable to review all changed evaluations.

In looking back at previous grading there are two cases to consider. The first is all assessee strokes for which the assessor expressed no correction. In this case the matching algorithm assigned the grade and/or feedback for that stroke. Any such strokes which change feedback as a result of retraining the matching algorithm may be reconsidered by the assessor because the grade is now different from what the assessor was shown. Strokes to be re-reviewed by an assessor may also include those uncorrected strokes for which their confidence has gone below the threshold for automatic grading.

The second case is where the results of the matching algorithm were corrected by the assessor. These may not need to be reviewed. It can be assumed that the assessor reviewed those items and made the feedback assignment for a good reason.

The assessee feedback may include a grade feedback view, which may include of all assessee strokes, and all correct assessor strokes that are unmatched by assessee strokes and their attached feedback. Feedback can be shown by a mark on each stroke for which feedback is provided. This mark may consist of the score for that particular stroke, comments, explanations, letter grades, pass/fail, etc. In one embodiment, feedback from all assessor answer items is displayed adjacent to the grade feedback view, as in FIG. 9. When a stroke is selected by the assessee, the feedback from the corresponding assessor answer item is highlighted. This highlight may also include a line or other visual connection between the selected stroke and the corresponding highlight. A second feedback strategy may show highlight information when a particular stroke is selected. Selection may occur by clicking, touching, mousing-over or any of a variety of interactive techniques for pointing at a stroke. When a stroke is selected its corresponding feedback may appear.

In some instance, it may be helpful to deliver assessee feedback outside of the digital ink problem system. For example, feedback may be delivered through a webpage, email or social media posting. In such cases, the grade feedback view can be rendered as an image or a drawing and included in the message along with the selected feedback. There can be hyperlinks from marks on the grade feedback view image to the corresponding feedback. In the absence of hyperlinking capability, the marks can have footnote-style references such as letters or numbers embedded in the image.

As previously described, a challenge disagreement can be associated with specific assessee strokes or with assessor strokes that that did not match assessee strokes. In the feedback system an assessee may additionally select one of the strokes with which the assessee disagrees and then create any combination of text, drawing, image, audio, video or reference to class materials that supports the assessee's disagreement. This disagreement may then be submitted to the system.

The assessor may, in some embodiments, see the challenge in the same user interface that the assessor used for grading, with the addition of the challenge comments attached to some of the strokes. The assessor may simply make a reply to the assessee with no further action. The assessor may correct the original grading by selecting a different assessor answer item to associate with the assessee's strokes. This correction of the original grading may remove any training items that were added because of the original grading and add the selected stroke as a training stroke to the newly selected item. The assessor may create a new assessor answer item with new feedback and scoring. This new answer item may be associated with the stroke selected by the assessee in the challenge. New training examples may modify the matching algorithm. In some embodiments, the system may provide an alert or otherwise notify the assessor of changes that should or possibly should be made to other assessments or challenge problems that have already been graded and returned to the assessees.

Much of the description above relates to problem systems in which digital ink strokes are used to answer challenge problems. As also described above, some problem systems may include challenge problems that can be answered via a draggable object answer.

In the context of the above description, a gradable problem system may include challenge problems based on dragging objects around a display surface or within a challenge problem (e.g., an image). An object-dragging problem may include an optional background drawing, an optional overlay drawing, a set of one or more draggable objects, and/or an optional set of instructions that pose the problem.

The background drawing may provide some context for the problem and gives some indication to the assessee as to where draggable objects should be placed. The overlay drawing, if one exists at all, may have transparent portions. The overlay drawing may be drawn so that it appears over the top of the background drawing and the draggable objects. The overlay may provide visual cues that are not obscured by the draggable objects. The draggable objects may be small text, drawings or images that can be interactively moved by an assessee when answering or otherwise addressing the challenge problem. The instructions include any combination of text, image, drawing, audio or video that tells the assessee what the problem is. The instructions may be embedded in the background or overlay drawings, or they may be independent.

Answers in an object dragging problem may be defined by regions and their relationships. A region may be defined as any set of one or more pixels. There may be fixed regions in a problem. Fixed regions may remain constant during the course of creating answers to the problem. However, fixed regions may be used for defining a correct answer. In some embodiments, a fixed region is made visible to the assessor and assessee by the background and/or overlay. An object dragging problem may have no fixed regions, or one or more fixed regions.

An object dragging problem may include at least one draggable object. An assessee may create an answer by moving one or more draggable objects around the problem space. A draggable object may have a visible component defined by text, drawing or image. It is this visible component that assessees and assessors use to understand an answer. A draggable object may have a region. A draggable object's region may just be the pixels that it draws.

In some embodiments, an object's region might include a bounding rectangle around the drawing. A single point may also be used as an object's region. For example, the pointer object, such as an arrow, may only have the tip of the arrow as its region. The rest of the pixels illustrating the arrow may just make the arrow easier to see and drag.

Dragging an object around may move the location where the pixels of that object's region are located. In various embodiments, it is the moving of such objects that changes the relationships that form the answer that the assessee or assessor is trying to express.

In various embodiments, there are basic geometric relationships between regions. These relationships can be readily computed from the regions. Examples of such geometric relationships are provided below. Additional relationships are possible and are innumerable; accordingly, the following examples are not exhaustive. The relationships below may be described as Boolean (True/False) expressions. In other embodiments, the relationships may be expressed as quantities values, percentages, distances, etc.

Intersects(A,B)—exists when at least one of the pixels in A is also a pixel in B.

Contains(A,B)—exists when all of the pixels of B are also pixels of A. The Contains( ) is transitive. Accordingly, if Contains(A,B) AND Contains(B,C), then Contains(A,C).

LeftOf(A,B)—exists when at least one pixel in A has an X coordinate that is less than the X coordinates of all pixels in B and at least one pixel in B has an X coordinate that is greater than the X coordinates of all pixels in A. There are other possible formulations of this relation. There are also similar relations such as RightOf( ), Above( ) and Below( ).

Near(A,B)—exists when at least one pixel of A is within some maximum distance of some pixel of B.

There are many possible geometric relations. It is sufficient for this discussion that a problem have at least one geometric relation that is visibly understood by assessors and assessees. The geometric relations on which a problem is founded should normally be visually understandable to both assessees and assessors.

In addition to visual geometric relationships there may be answer relationships. An answer relationship may be derived from one or more geometric relationships. For example, an answer relationship might be LessThen( ) which is derived directly from LeftOf( ) Another answer relationship might be GroupsWith( ) which might be defined as the transitive closure of Near( ). It is the answer relationship that is used to determine matches between answers.

Draggable object problems may be very open-ended and allow for a significant amount of creativity on the part of assessors to create challenge problems. For example, while hot spot quizzes allow a student to click on a specific region to express an answer, in a draggable object system the assessor can make a more general problem with different kinds of objects being dragged to various regions of the problem.

Draggable object quizzes allow for general groupings and arbitrary drawings. Matching relationships can involve more than two objects and can be formed in an open-ended way by the assessee. When an assessee is posed a problem in an object dragging system, the assessee may be shown the background, draggable objects, overlay, and/or instructions. The assessee answers the problem by dragging some or all of the various draggable objects to new locations. Dragging may occur using a mouse, finger, stylus, trackball, arrow keys and/or any other interactive device or technique that allows the assessee to move a draggable object to a new location relative to a display. An assessee's answer may include the placement of the draggable objects and the relationships derived from those placements. In some instances of an object dragging system, dragging an object from its start position makes a copy of the object to drag. This may allow the same draggable object to be used multiple times in answering the problem.

The assessee's answer may be defined by the actual placement of the objects. In other embodiments, the assessee's answer may not be defined by the actual placement of the objects, but by the geometric relationships among regions that are computed from that placement and in particular the answer relationships that are computed from the geometric relationships.

As part of a system, the software may dynamically compute the answer relation and provide feedback to the assessee when that relation holds. For example when objects are being grouped together using a GroupsWith( ) relation, the Near( ) and GroupsWith( ) relations can be dynamically computed while an assessee is dragging an object and all other objects that group with the one being dragged can be highlighted. There are many such highlight approaches possible for various answer relationships, and these approaches make it easier for the assessee to produce a correct answer.

Figure 11:
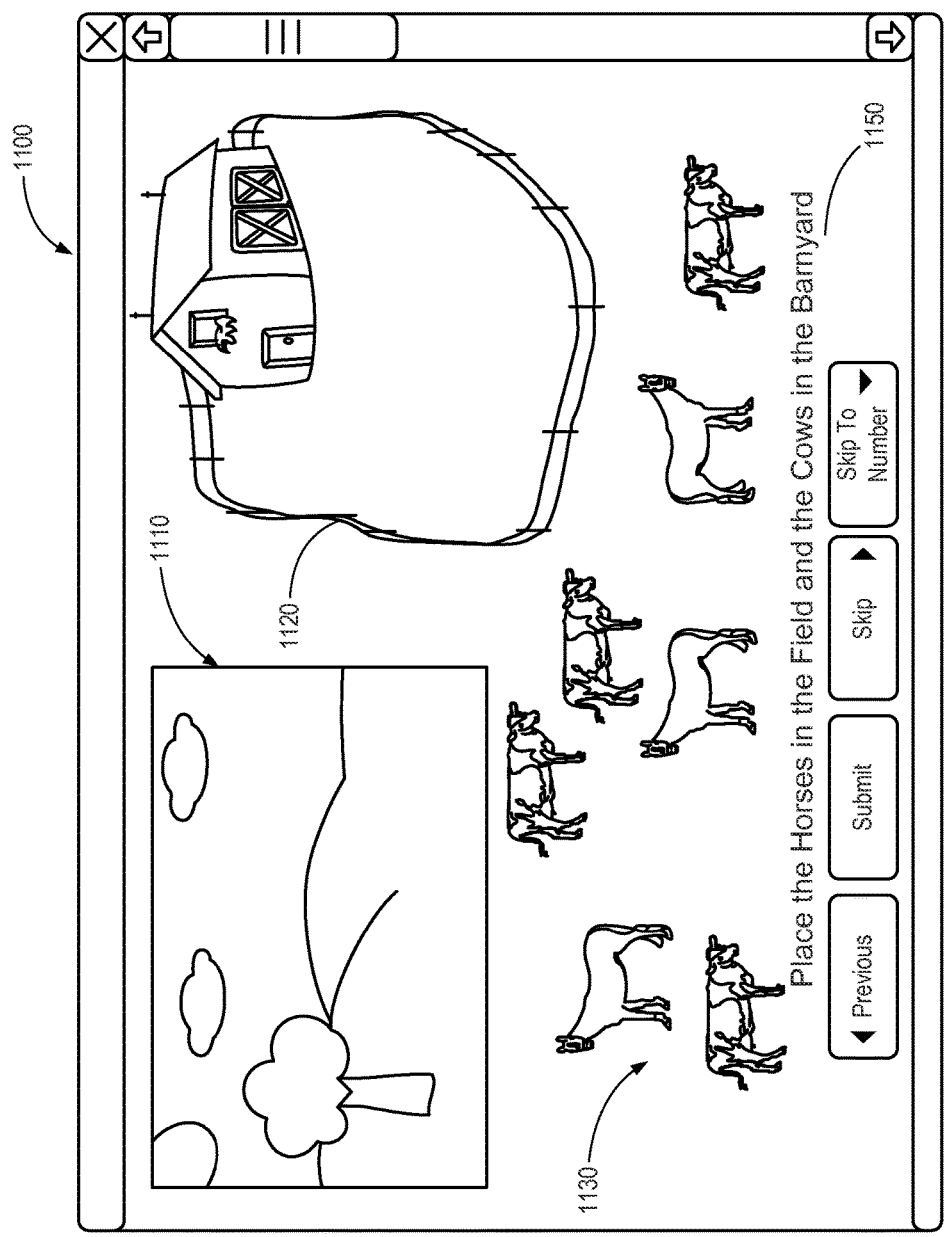
FIG. 11 illustrates a representation of a GUI with a challenge problem that can be answered via draggable answer items.

FIG. 11 illustrates a representation of a GUI 1100 with a challenge problem that can be answered via draggable answer items. As illustrated, the instructions 1150 are to put the horses (animals 1130) in the field 1110 and the cows (animals 1130) into the barnyard 1120. The field 1110 and barnyard 1120 are part of the background drawing. The horses and cows 1130 are draggable objects. The assessee answers the problem by moving the horses and cows 1130 relative to the field 1110 and the barnyard 1120.

The field 1110 and the barnyard 1120 are designated as fixed, relevant regions for evaluating the assessee's answer. In the case of the field 1110, the relevant region is a simple rectangle. In the case of the barnyard 1120, the relevant region is a more complex geometric shape. The horses and cows 1130 may have their regions defined by their colored pixels, a perimeter, a centroid, a center point, a plurality of pixels within the perimeter, or the like. Using the center point of a horse to compute relationships will allow a student and/or instructor to be a little sloppy about where they place the horse relative to the field. By using the center point, a horse's ears or feet may be outside of the field but Contains (field, horse) would still be true.

In some embodiments, when a draggable object is placed within a region, such as the field 1110 or the barnyard 1120, some indication may be provided to the assessee. For example, a sound, blinking, highlighting, or other notification may be provided. In some embodiments, a draggable object may "snap" within a region when it is dragged partially within a region. Thus, if an assessee attempts to drag a horse to be partially within the barnyard, it may snap, i.e., move, to be completely within the barnyard so that there is no confusion on the assessee's part.

Figure 12:
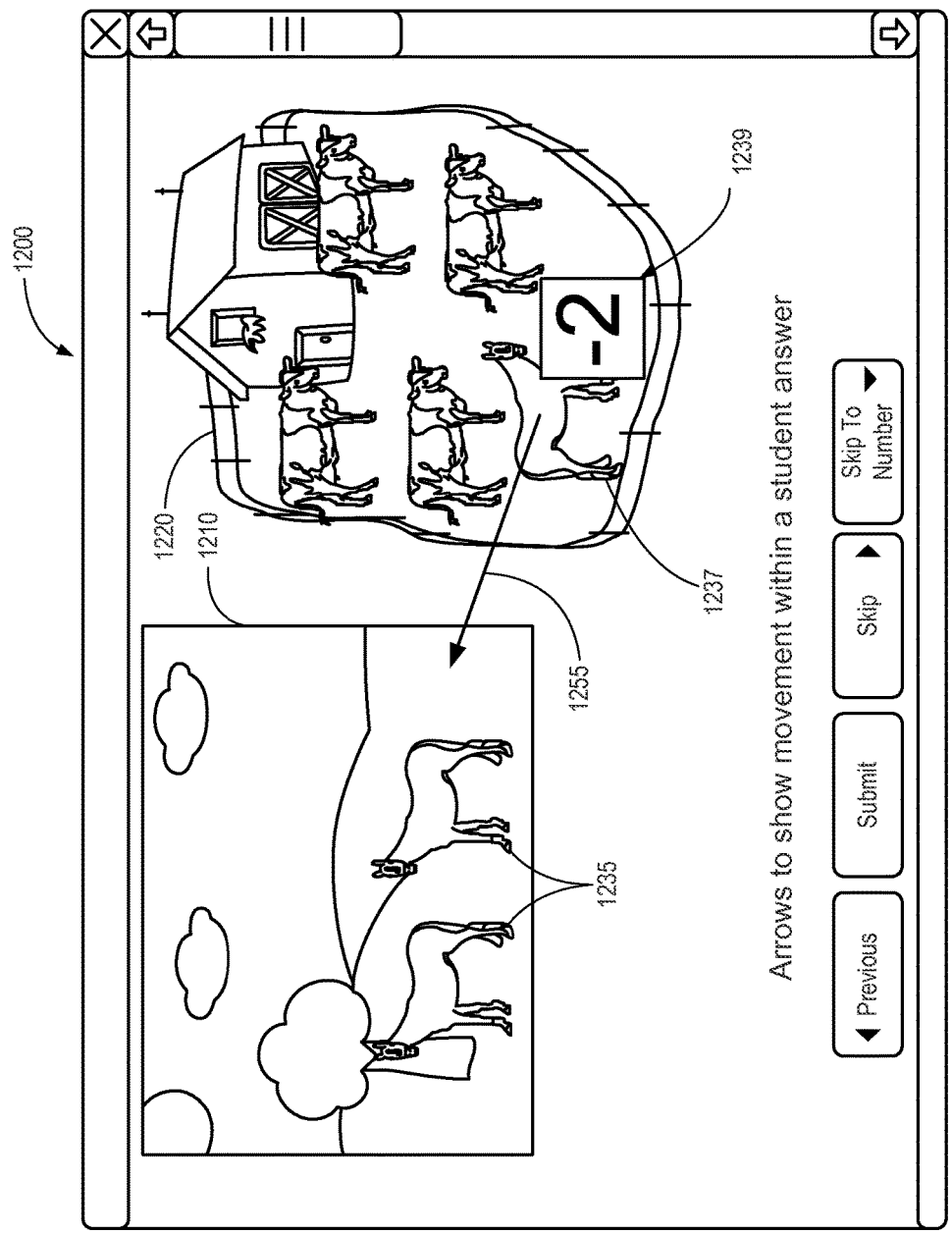
FIG. 12 illustrates a representation of a GUI after an assessee has answered the challenge problem by dragging objects relative to the challenge problem.

FIG. 12 illustrates a representation of a GUI 1200 after an assessee has answered the challenge problem by dragging objects relative to the challenge problem. As illustrated, an assessee may incorrectly place a horse 1237 within the barnyard 1220. The assessee may receive points or positive feedback for horses 1235 placed within field 1210 and for cows placed within barnyard 1220. However, an arrow 1255 may provide feedback to the assessee about the mistake made and a negative score 1239 of "−2" may indicate a loss of points.

Figure 13:
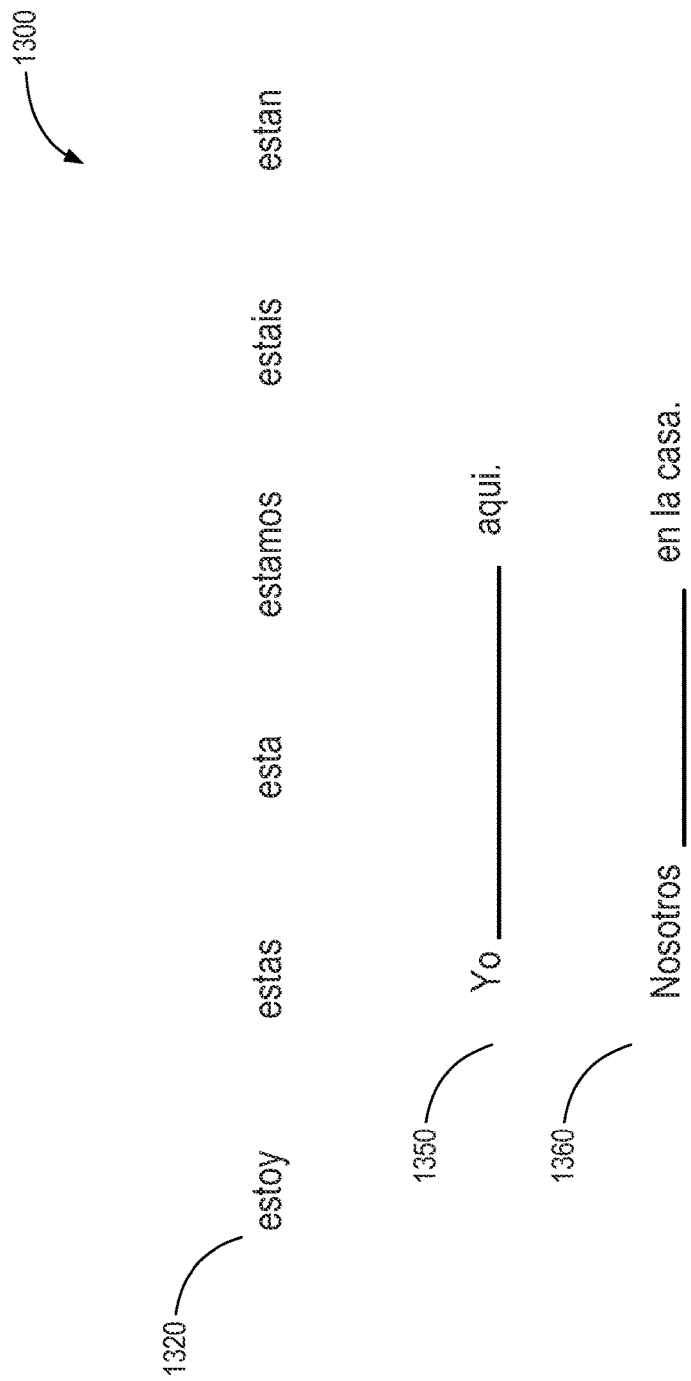
FIG. 13 illustrates another example of a challenge problem that may be answered by dragging objects relative to the challenge problem.

FIG. 13 illustrates another example of a challenge problem 1300 that may be answered by dragging objects (conjugated verbs of the Spanish word "estar" 1320) to the correct location in the phrases 1350 and 1360. The instructions may be to drag the correct conjugations of the verb estar into the blank spaces in the phrases. The various forms of estar are the draggable objects, and the incomplete sentences are part of either the background or the overlay depending on how the author wishes them to appear. In this case the blank spaces in the sentences are relevant regions. The relevant regions could be defined larger than a viewable image, and the bounding box of each verb would be its region. This would allow Contains(sentanceBlank, verb) to be used in evaluation of the answer.

In some uses the correct answer for a draggable object problem may be defined by an ordering. For example, a problem may solicit that an assessee rearrange the battles of the Revolutionary War in their chronological order from left to right. In this example, there may be no background or overlay, only the names of battles as draggable objects and the instructions. The geometric relation LeftOf( ) could be used to compute the answer relation Before( ).

Figure 14:
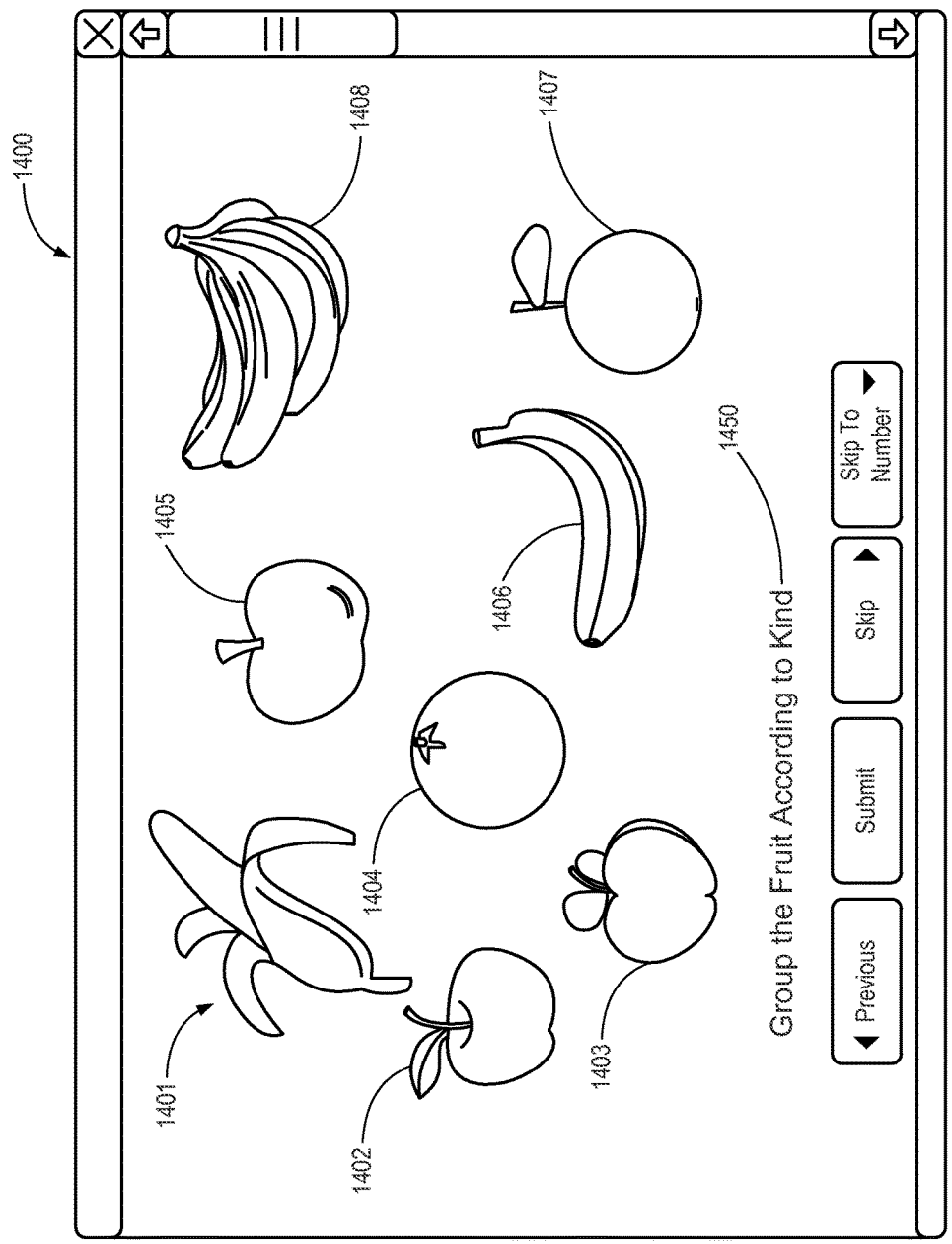
FIG. 14 illustrates a representation of a GUI with a grouping challenge problem that can be answered via draggable answer items.

FIG. 14 illustrates a representation of a GUI 1400 with a grouping challenge problem that can be answered via draggable answer items. In the illustrated embodiment, various kinds of fruit 1401-1408 are supposed to be grouped together by the assessee, as indicated by the instructions 1450. In this example the fruit 1401-1408 are draggable objects and the instructions are embedded in the background image. The geometric relation Near( ) could be used to compute the answer relation GroupsWith( ).

The authoring system may include interactive software for (1) creating or acquiring the background and/or overlay drawings for the problem, (2) creating or acquiring the visual components of the draggable objects and definition of their regions, (3) designating any fixed or relevant regions or relationships for the problem, (4) creating the problem instructions (possibly empty), (5) creating zero or more correct draggable object placements along with any associated feedback and (6) selecting a scoring rule. Both the background and/or the overlay may be optional for some challenge problems.

As part of an object dragging authoring system, the assessor may specify the relationships or regions that are relevant. For example, the assessor may specify that ordering along the Y axis is relevant or that grouping is relevant. This interaction from the author can be used to specify how answer relations should be computed from geometric relations.

The assessor may specify fixed or relevant regions using a variety of interactive techniques. A fixed region might be defined by a bounding rectangle, by painting the pixels that are to be part of the region or by defining some closed shape.

Any interactive mechanism suitable for defining a set of pixels can be used for this purpose. The definition of a relevant shape may be defined implicitly from portions of the background or overlay. For example, the barnyard region 1120 in FIG. 11 might be defined implicitly as all of the pixels inside of the fence drawing.

If an ordering relationship, such as a challenge problem associated with putting a list of the revolutionary battles in order, is desired, it is helpful to specify an attribute for each draggable object that can be used to define the ordering. For example, with the revolutionary battles, an assessor could specify a year/month for each battle object. The year/month ordering would implicitly define the correct ordering on the Y axis from top to bottom or on the X axis from left to right. An ordering attribute could be a textual string (alphabetic order), a number (numeric order) or any other ordering for which there exists a comparison algorithm for testing the order and sorting the draggable objects.

When such attributes are used to specify ordering, the authoring system may allow the assessor to specify a description of the attribute along with a description of the relationship. For example a description of the attribute might be "This battle occurred in AttValue." This could be used to describe one or more of the battles that are out of order. The relationship description could have two parts. The first is a statement of correctness, "These battles are in the right order." The second is a statement of incorrectness, "These battles are in the wrong order." These descriptions can be used by the feedback system to generate feedback for many possible variations without the assessor needing to enumerate them.

A correct answer may be formed by an assessor by dragging objects into positions that have an answer relationship consistent with a correct answer. Alternatively, a correct assessor answer may be made when an assessor evaluates assessee answer items and associates a feedback tag therewith. Feedback tags may include explanation and/or instructional items that teach the appropriate principles.

In some cases the assessor knows specific answers that derive from specific misunderstandings. For example in FIG. 11, the assessee might put all of the horses in the barnyard and all of the cows in the field. The assessor can create such an incorrect answer and add it to the problem with specific feedback and scoring.

In an object dragging problem system an answer may be characterized by the placement of one or more of the draggable objects. From the placement of the objects, the geometric relations may be computed and the answer relations then computed. The correctness of an answer item may be determined by its geometric and answer relations. Any mechanism for computing answer relations from the placements of draggable objects may be included in this definition of an answer item.

The object dragging matching algorithm may compare an assessee answer with a set of correct assessor answers. An assessee answer matches an assessor answer if the answer relations computed from the assessee's object placements are identical to the answer relations computed from an assessor's object placements. This form of exact match is suitable for correctness but may not provide feedback and/or scoring for partially correct answers.

In some embodiments, the system may compute a distance between an assessee answer and an assessor answer based on a series of edits that can be made to the assessee's answer so that it identically matches an assessor answer. Each edit can be assigned a cost such that the edit distance is the sum of the costs of the individual edits required to make an assessee's answer match an assessor's answer.

In some embodiments, an edit can be defined as the movement of a draggable object in an assessee answer from one location to another. For example if a horse is in the barnyard of FIG. 11, an appropriate edit would be to move the horse to the field.

They system may then take two answer relations S (assessee) and I (assessor) and compute a set of object movements such that the new assessee answer S' matches I. The result of the matching algorithm then will be an assessee answer S with the correct assessor answer I such that the edit distance between S and I is less than or equal to the edit distance between S and all other correct assessor answers. Additionally the result of the matching algorithm will include zero or more edits that will bring S to a match with I.

In some embodiments, the system may compute a minimal edit distance between an assessee answer S and an assessor answer I to compare their answer relations. We can consider the following kinds of edits to an assessee's answer relation (r) to bring it in line with the assessor's answer relation:

Add the relationship A r B to the assessee's answer relation where A and B are regions in the problem.

Remove the relationship A r B from the assessee's answer relation.

Reverse the relationship A r B to become B r A in the assessee's answer relation.

As provided herein, there are many ways in which draggable object placements can be converted into geometric relationships and then into answer relationships. For many such algorithms there is a reversible algorithm that can convert an answer relation edit into a geometric relation edit and then convert that geometric relation edit into an object movement.

For example in FIG. 11, if a horse is placed in the barnyard, the relation In(horse, barnyard) is in the assessee answer and the relation In(horse, field) is missing from the assessee answer. If the answer relation In(horse, barnyard) is removed, then the geometric relation Contains(barnyard, horse) may also be removed. To add the answer relation In(horse, field) the geometric relation Contains(field, horse) can be added. A movement of horse may be computed that will make it so that it is not contained by the barnyard. Similarly a movement of horse can be computed that will put it in the field. In one embodiment, In(horse, barnyard) is corrected by first moving the horse out of the barnyard and then moving the horse into the field in a second edit to correct In(horse, field). In another embodiment, In(horse, field) is corrected by first moving it into the field, which implicitly corrects In(horse, barnyard) as well in just one edit. This second choice may provide a minimal description of how to fix the problem.

We can use Dykstra's algorithm to compute just such a set of edits. We can define a priority queue that contains items consisting of (assesseeAnswer, cumulativeCost, editList). This priority queue is always sorted with items with lowest cumulativeCost on top. A heap is a suitable implementation for the priority queue, but other implementations may also be used. Example Psuedo code is provided below:

```
Loop
{       V = priorityQueue.removeLeastCostItem( );
        Edits = computeEditDiffs(V.assesseeAnswer.answerRelation( ),
        I.answerRelation( ));
        If (Edits is empty)
        {   Return V.editList; }
        For each E in Edits
        {   G = E.geometryRelationChange( );
            M = G.suitableMovement( );
            priorityQueue.add(
                V.assesseeAnswer.apply(M),
                V.cumulativeCost+M.cost,
                V.editList + E);
        }
}
```

In the above, computeEditDiffs(S, I) compares two answer relations S and I and produces a list of possible individual edits that will bring S closer to I. Edit.geometryRelationChange( ) takes a change to an answer relation and returns the corresponding changes to the underlying geometric relations that the answer relation was derived from. Geo.suitableMovement( ) takes a change to a geometric relation and returns an object movement that will cause the relationship change Geo to be true. Finally, assesseeAnswer.apply(Movement) takes an assessee answer consisting of object placements and applies the Movement to that answer producing a new assessee answer with the object moved.

Such an algorithm may return a list of object movements that will convert the assessee answer into the assessor answer. If there are multiple correct assessor answers, we may use the one that has the least edit distance from the assessee answer. The matching algorithm returns the least cost correct assessor answer and the list of object movements required to bring the assessee answer into line with the assessor answer.

Feedback about incorrect answers is attached to edits. The purpose of an edit may be to change some portion of the assessee's answer relationship so that it will be more correct. The purpose of feedback may be to explain the changes so that an assessee understands what was wrong. Thus feedback on incorrect answers may be attached to particular relationship changes. Because there are many possible relationships in an assessee answer relation, there might be many possible feedback entries. Providing all of them can be exhaustive for the assessor. One way to mitigate this problem is based on the idea that some object movements correct many relationships. Transitive or reflexive closure of a relationship can cause this. The minimal edit distance algorithm will automatically select edits that take the least number of changes to reach a correct match. Ones that exploit transitivity or other closure properties will accomplish more with fewer steps and automatically be selected.

Another way to mitigate this problem is based on biasing the minimal edit distance algorithm to use edits for which the assessor has already provided feedback. We can include this information in our relation match difference algorithm by giving edits that have feedback attached to a lower cost than edits that do not. This will cause the algorithm to choose explainable edits (ones with feedback) in preference to others. Edits that have no associated feedback can be augmented in the grading system.

If there are N objects being compared, there are N2 possible relationship settings. This means that there are a maximum of N2 edits to convert one answer relationship into another. Suppose that the lowest cost edit has a cost of 1, we can assign a discount value D to edits for which there already is an explanation. The discount D is subtracted from the normal cost of an edit when using that edit choice in Dykstra's algorithm. Provided D<=1/(2*N2), use of the discounted costs will still provide a minimal edit distance because the discounts will not accumulate to a greater value than the actual cost. However, if multiple edit paths are equal, using the discounted costs for edits that already have feedback will most likely include more existing feedback. This will reduce the amount of feedback that an assessor must provide.

The results of the matching algorithm may include the assessee answer, the closest correct assessor answer, a set of object movements that will cause the assessee answer to be consistent with the correct assessor answer, and/or feedback (e.g., a feedback tag) associated with some or all of the object movement corrections.

One part of the object dragging grading system may include presenting the set of object movements necessary to correct the assessee answer. There are several possible means for displaying these object movements. For example, the presentation could include both the assessee answer and the assessor answer with arrows showing where erroneous assessee placements should be moved. Such an example is illustrated by arrow 1255 in FIG. 12 showing that the horse 1237 should be moved to the field 1210. In some situations there may be too many arrows. A presentation can highlight for the assessor or assessee those objects that are incorrectly placed in the assessee answer.

Figure 15:
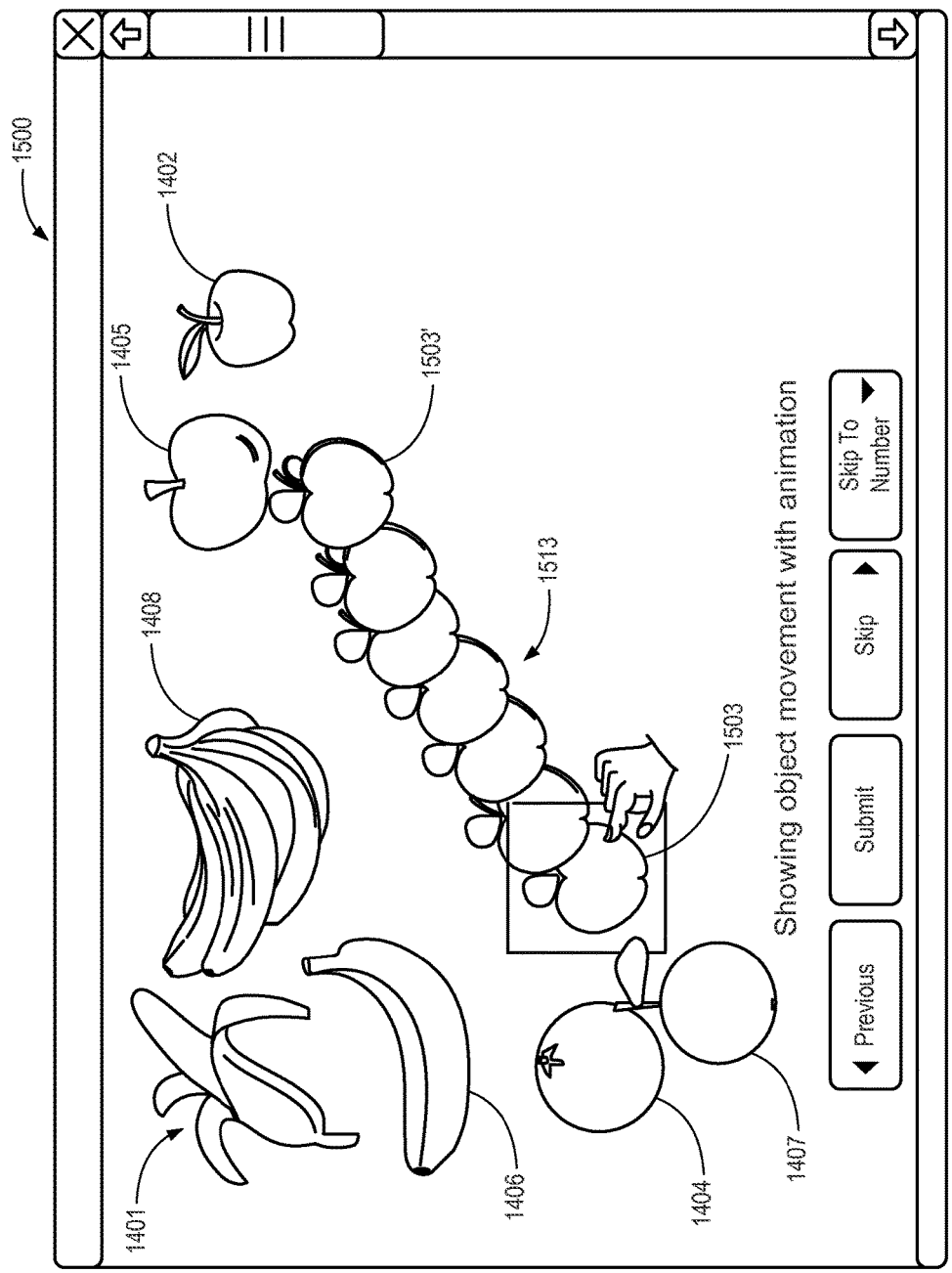
FIG. 15 illustrates a representation of GUI showing a displayed dragging motion as an assessee provides a draggable answer item to the grouping challenge problem.

FIG. 15 illustrates a representation of GUI 1500 in which the movement is shown with animation 1513 to show the correct placement of a draggable answer item to the grouping challenge problem of FIG. 14. As illustrated, the animation 1513 shows that the apple 1503 should have been placed with the other apples 1405 and 1402 in an example location 1503'.

As described above in the context of the general gradable problems, in addition to showing the movements of objects that will correct a student answer, it may be desirable to also show the feedback associated with the correction. Feedback may be associated with object movements. However, in some situations, associating feedback with object movements may be too brittle because it depends on too many things being exactly the same as when feedback was created. Instead we may associate feedback with a set of changes to the assessee's answer relation. For example, the change to the apple shown in FIG. 15 will cause GroupsWith(apple, orange) to be removed and GroupsWith(apple, apple) to be added. These two relationship changes can be associated with a feedback and scoring item that says something to the effect of "apples go with apples, not with oranges."

One approach is to list all of the feedback tags and then show arrows or other connections between incorrectly placed objects and the associated feedback. Another approach is to only present the connections to feedback when the object is selected. Yet another approach is to not present all of the feedback, but only the feedback associated with a currently selected object in the assessee's answer.

The highlight of incorrectly placed objects might also show the score change caused by that placement. For example, FIG. 12 shows a -2 near the horse to indicate the points lost by incorrectly placing the horse.

There are several ways in which the results of the matching algorithm could be incorrect. In some embodiments, the assessor may correct an error by moving the object(s) in question to correct locations. These movements can be captured by the system by storing the resulting answer relation as a new correct assessor answer. In some instances an error may occur because of a previously entered assessor answer that was listed as correct. That previous answer was consistent with the corrected assessee answer. That previous correct assessee answer should be shown to the assessor so that the assessor can remove the assessor's own corrections and/or remove the previously correct assessor answer and eliminate the conflict.

In some instances, the assessor may select the object movement by some interactive means and then specify the new feedback for that movement. An object movement has a source position for the draggable object and a destination position. Each of these positions may have a specific geometric relationship associated with the object in question. These geometric relationships may translate directly into answer relationships using the same algorithm or rules used by the original matching algorithm.

In various embodiments, one or more of those answer relationships may be the same for the source and destination object position. Relationships that are unchanged by the movement can be ignored. The answer relationships that are different between the source and destination may have feedback associated with them. In the case of the source object position, some relationships are being broken. The broken relationships can be collected into a feedback rule, and the assessor can associate feedback with that rule. The associated feedback can either be created anew or selected from existing feedback. This rule can match future object movement edits and offer the feedback in the future about incorrect relationships.

In some embodiments, the assessor may select the object movement and specify new feedback for that movement. The feedback may be associated with the source position's answer relationships. In this case there may be a conflict between the old feedback and the new feedback. The assessor may resolve this conflict by selecting one or the other.

Assessee feedback allows the assessee to understand the grade received and the feedback that will help to correct the assessee's knowledge. The possibilities for presenting assessee feedback may be similar to those found in the grading system. The only difference is that the student may not have the user interface elements for correcting the grade. The assessee may only see the results of the matching algorithm and associated feedback.

The student challenge system allows the student to contest a grading result. Similar to the description above, a student challenge in an object dragging challenge problem may include a correction to the instructor answer and, optionally, a rationale.

In addition to challenge problems based on digital ink stroke and/or draggable object answers, the present systems and methods may include challenge problems that are answered by annotation answer items.

An annotated study problem may include source material and a set of one or more issues or questions. For example, source material may include any combination of text, drawing, image, audio, and/or video. An assessee may select portions of the source material to use as an answer to an issue or a question. Source material might, for example, include simple text, webpage, e-reader text, drawings for a house, mechanism or piece of digital electronics. A question or an issue is any combination of text, image, drawing, audio or video that poses a challenge that the assessee should address while reviewing, studying, watching, interacting with, or otherwise engaging with the source material. The issues or questions provide the focus for the assessee's engagement with the source material. The assessee may be instructed to search for portions of the source material that relate to the issues or questions. Because the source material might be as extensive as several book chapters, there may be several or even many questions or issues that the assessee should be searching to answer.

In some embodiments, the assessee may answer or work a problem by reviewing the issues or questions to be addressed. The assessee may then engage (e.g., study) the source material. While studying the source material, the assessee may select, highlight, cut and paste, and/or otherwise annotate portions of the source material that address one of the issues or questions.

The issue or question that the assessee thinks is addressed by the selected source material is selected and interactively associated with the selected portion of the source material. There may be many portions of the source material associated with each issue or question, and there may be one or more issues or questions associated with each selected portion of source material. A selection of some portion of the source material combined with a reference to one or more of the problem's issues or questions constitute an answer item. An assessee answer may comprise one or more such answer items.

The following provides several examples of challenge problems that can be answered via one or more annotation answer items. As a first example, an elementary school assessee might be given a short paragraph to read. The questions might be of the form: Who is older Jim or John? Who owns a bicycle? When did they leave school?

For each of these questions the assessee may be expected to select or highlight the portions of the paragraph that answer each question. A system designed for this might allow the paragraph text to be highlighted using different colored pens, one color for each question. Each highlighted region or portion of a highlighted region in the paragraph may constitute an answer item with the highlight color associating the highlighted selection with a question.

As another example, a college history class may assign a chapter of reading in an e-textbook. This chapter might be about the Great Depression. Before the reading the assessees are given the following issues: (1) mechanization caused many people to lose jobs without giving them the skills to acquire new ones; (2) FDR's deficit spending shortened the Great Depression; and (3) the gold monetary standard created too little money to support growth in the economy.

The assessee's instructions may be to find portions of the reading that either support or refute one or more of these statements. As an example, supporting information may be highlighted in green and refutations in red. Before highlighting, the assessee may select the issue to which the selected material should relate. The number of the issue may be shown with the highlight in the text. In essence this may be considered six questions rather than three, because each issue has a "for" and "against" position. Each highlight with its color and issue number may constitute an answer item.

As another example, an architecture assessee might be given a set of digital drawings for a new office building. In addition there are several items from the American Disabilities Act (ADA) that pertain to accessibility in buildings. The assessee is asked to find all ADA violations in the drawings and associate those selections with the portion of the ADA that has been violated. The portions of the ADA form the issues, and the selections from the drawings when attached to issues form answer items.

As another example, an electrical engineering assessee is given a logic design for a primitive microcontroller. The assessee is asked to identify any adder logic and any instruction decoder logic. Selecting logic components and indicating they are part of an adder or part of decoder may constitute an answer item. The selection could be in the form of any annotation or marking.

As another example, an assessee may be given a set of key civil rights issues from the 1960s and a video of Martin Luther King's "I Have A Dream" speech. The assessee is asked to indicate in the video when and if each of the issues is addressed. The goal is to have the assessee listen for content beyond just the emotional impact of the speech. The assessee may mark, timestamp, or otherwise provide an annotation associated with a timestamp in the video.

All of these problems pose rich source materials, ask questions and pose issues about those materials, and then ask assessees to digitally identify the answers to those questions and/or issues. This supports a very rich form of study while providing automatic grading of work. It is appreciated that highlighting may be substituted for any type of annotation, such as drawing a box, underlining, coloring, or other annotation or marking.

As provided herein, an annotated study system may allow the assessee to interactively view, listen to, and/or otherwise engage with the source material, allow the assessee to interactively select or otherwise annotate a portion of the source material and associate that selected portion with a question or issue, and/or allow the assesse to visually highlight previously created associations between portions of the source and the issues or questions.

An annotated study authoring system may include interactive tools for acquiring, creating and/or recording source materials. The authoring system may also allow the assessor to interactively view, listen to and/or otherwise engage with the source material. The authoring system may allow the assessor to interactively create and/or acquire the text, drawing, image, audio and/or video for each question or issue that is to be presented to the assessee.

The annotated study authoring system may also allow the assessor to interactively create answer items in a manner similar to the quiz system. This creation of answer items may be used for an assessor to construct correct answer annotations for the various questions or issues that have been posed. For each such answer item, the authoring system may allow the assessor to interactively create and/or acquire feedback materials (any combination of text, drawing, image, audio and/or video) that can be attached to an answer item. Attaching such feedback materials to an answer item can assist assessees that omit that particular answer item.

The authoring system may also allow scoring information to be attached to answer items. The annotated study authoring system may also allow the assessor to create incorrect answer items and associate feedback with them. The use of incorrect answer items is to provide feedback on common assessee mistakes.

The annotated study matching algorithm may compare assessee answer items to assessor answer items, that include an assessor answer and associated feedback tag(s). As part of the comparison between answer items, there may be a distance metric for how closely the answer items match. There may also be a maximum distance threshold for this distance, beyond which there is no match. When comparing an assessee answer with an assessor answer, the match may be performed on an answer-item-by-answer-item basis. The result of the matching algorithm may contain one or more of the following four parts:

(1) A set of assessee answer items that each matches a corresponding correct assessor answer item.

(2) A set of assessee answer items that each matches a corresponding incorrect assessor answer item.

(3) A set of assessee answer items that does not match any assessor answer item.

(4) A set of correct assessor answer items that does not match any assessee answer item.

The matching between an assessee answer item and an assessor answer item may be based on the way the selected portion of source material is represented. Three common forms for representing the selection include: sequential, spatial and sets. Alternative forms for representing a selection may also be used.

Some forms of source material are essentially sequential in nature. These include text, audio, and video. They have a notion of starting to read, view or listen and proceeding sequentially to the end. For such sequential source items a selection can be represented as a starting point and an ending point. A selection can also be represented as a single point in the sequence. Such single point selections may be represented by an identical starting and ending point. In text, for example, the starting point might be a word or character and the ending point a word or character later in the sequence. All words or characters between them are selected. Similarly with audio the starting and ending points might be sample indices or timestamps. Video might use frame numbers or timestamps.

A distance metric between two answer items A and B can be computed using the formula: Abs(A.start-B.start)+Abs (A.end-B.end), where Abs( ) is the absolute value. If two answer items have the same start and end, the distance between them will be zero. We can augment this simple distance by the rule: If (A.start>B.end) or (A.end<B.start) then make the distance infinite (very large).

This rule catches the case when two answer items do not overlap at all. This rule may not be as suitable when annotations are represented as a single point rather than a range. In such cases the absolute value of the difference between two points would constitute a distance metric. This might occur in audio or video where it is more convenient to indicate a particular point in the material rather than a range. Other distance metrics are possible, but these metrics at least will serve the purpose.

Spatial answer items may be used with drawings such as logic diagrams or building plans. In such cases a geometric region may be used as the selection of an answer item. Such geometric region might be represented by a rectangle, a closed digital ink stroke, an ellipse or any other closed shape. One possible way to compare two spatial answer items A and B is to compute their intersection and then compute their area ratios. For example: I=intersect(A,B); If (area(I)==0), then distance is infinite or very large. Distance=area(A)/area(I)+area(B)/area(I)−2.

Other distance metrics can be used including ones that approximate the area in various ways for more rapid computation. In the given distance metric, if A and B are identical the distance is 0. As the two shapes get increasingly dissimilar the distance grows larger.

The source material may comprise a set of objects. For example a text could include a set of words. A drawing might include a set of lines, circles and rectangles, and a logic diagram might include a set of gates and connectors. A video might include a set of pixels on frames. Given such a source representation, an answer item's selection might include a subset of the objects in the source materials. For example, there might be the lines, circles and rectangles in an architecture drawing that compose a bathroom that is not ADA compliant. Using sets of objects as our representation we can use intersection and set size (number of items in the set) to compute a distance metric.

For example: I=intersect(A,B); If (size(I)==0) then distance is infinite or very large. Distance=size(A)/size(I)+size(B)/size(I)−2. Other distance metrics can be used including ones that approximate the set size in various ways for more rapid computation. In the given distance metric if A and B are identical the distance is 0. As the two sets contain more objects not shared between them, the distance grows larger.

The output of the matching algorithm may be significant to the grading system's work. One purpose of the grading system may be to correct any errors committed by the automatic grading system and, where useful, enrich the training examples for the matching algorithm and/or the feedback information provided to assessees. At this point in the process we have a grading instance which may include:
1. A challenge problem, including source material and one or more issues or questions;
2. One or more instructor answer items;
3. One or more highlights or annotations generated by the assessee; and/or
4. The results of the matching algorithm:
   a. One or more of the assessee annotation answer items matched with assessor answer items;
   b. One or more assessee annotation answer items that match no assessor answer items; and/or
   c. One or more correct assessor answer items that match no assessee annotation answer items.

The above information may form the basis for the grading system for study annotations. One goal of the grading system may be to present the assessor with the results of the automatic grading generated by the matching algorithm for evaluation.

Because study source materials may be quite large (an entire book or chapter, or perhaps the drawings for an entire building) one way to reduce the amount of time required for review by the assessor is to only present portions of the source materials.

To provide the assessor with sufficient context to provide a meaningful evaluation, selected portions may be shown with at least N % context around that selection. If, for example, N is 200% then a sequence or area twice as large as the selection may be shown. Other default values for context are possible.

Alternatively and/or additionally, to provide the assessor with sufficient context to provide a meaningful evaluation, the assessor may be allowed to interactively request context in which case the selected portion is shown highlighted in the original source materials.

The review time can be minimized by not showing selected portions, the match confidence for which is above a threshold. These can be assumed to be correctly graded. A system might interactively allow the user to request the display of omitted answer items. Another way to reduce review time is to show only items from one of the four cases with the assessor able to select the case the assessor is considering. In other embodiments, the system may show all types of answer items in their own window so that the assessor can readily see all of the types of answer items, but they are separated for clarity.

In addition to seeing all of the annotations, the assessor may see the scoring information and the feedback being given to the assessee. The total score for the problem can be displayed anywhere. Any of the views described above can be used for displaying feedback and scoring.

One approach is to show all feedback for currently displayed annotations in the area adjacent to the grading view. The assessor may then select any selected annotation portion being displayed in the grading view and have the feedback from corresponding assessor answer item highlighted. The assessor may also select any feedback and have the corresponding annotations highlighted in the grading view. A possible highlight is to show a line and/or arrow connection between selected annotations and their feedback. A variation would be to display all lines and/or arrows from feedback information to corresponding annotations.

Another approach is to show a mark next to any annotation in the grading view that has associated feedback. Selecting the mark would cause the corresponding score/feedback information for that annotation to appear. The feedback may appear outside the grading view, or immediately near the selected annotation. An example of a useful mark would be the score associated with each displayed annotation.

The assessor may initiate a correction by selecting an assessee annotation. When the annotation is selected, the corresponding feedback may be highlighted, made visible, or both. The assessor may change the feedback associated with the selected annotation. When an annotation is selected for correction, feedback for all existing assessor answer items for this problem may be displayed. The assessor may initiate a correction by selecting one of these other pieces of existing feedback information. When presenting feedback from other potential assessor answer items, these other items may be sorted by how closely their example annotations match the annotation being corrected. This sort order may assist by showing feedback from likely matching assessor answer items first. When the assessor selects a different assessor answer item for an annotation, the assessee annotation may be added to that assessor answer item as a new example to be used to train the matching algorithm.

If an appropriate assessor answer item for the currently selected assessee annotation does not yet exist, the grading system may allow the assessor to create a new assessor answer item using a similar user interface to the one used in the authoring system. This new assessor answer item may take the selected assessee annotation as its first example, and the new assessor answer item is added to this problem for future use.

In some instances, a correct assessor answer item may not be matched by any of the assessee annotations. If this is an error, it can be corrected and the assessee annotation can be matched to a correct assessor annotation. In some embodiments, this may include matching the unmatched assessee annotation with another assessee annotation that has already been tagged with feedback by the assessor. In both situations, the information may be added as a training example to the assessor's answer item and that assessee annotation acquires the new score and feedback of that answer item.

As corrections are made in the assignment of assessee annotations to assessor answer items, the training examples for the matching algorithm may be changed. Assessee annotations may be added as new training examples. This may cause the algorithm to change the way it classifies previously graded instances of this problem for other assessees. These previous grades may need assessor review.

Feedback can be shown by a mark on each annotation for which feedback is provided. Feedback information may be displayed from all assessor answer items adjacent to the grade feedback view. When an annotation is selected by the assessee, the feedback from the corresponding assessor answer item may be highlighted. This highlight may also include a line or other visual connection between the selected annotation and the corresponding highlighted feedback. Additionally and/or alternatively, feedback information may be shown when a particular annotation is selected. A selection may occur by clicking, touching, mousing over or any of a variety of interactive techniques for pointing at an annotation. When an annotation is selected its corresponding feedback will appear.

As in previous embodiments, it may be helpful to deliver assessee feedback by means outside of the study annotation problem system. For example, feedback may be delivered through a webpage, email or social media posting. In such cases, the grade feedback view can be rendered as an image or drawing and included in the message along with the selected feedback. There can be hyperlinks from marks on the grade feedback view image to the corresponding feedback. In the absence of hyperlinking capability, the marks can have footnote-style references such as letters or numbers embedded in the image.

As in previous embodiments, an assessee may challenge a grade, feedback, or other comment on an assessee answer item by submitting a disagreement request and/or substantiating or clarifying information.

Figure 16:
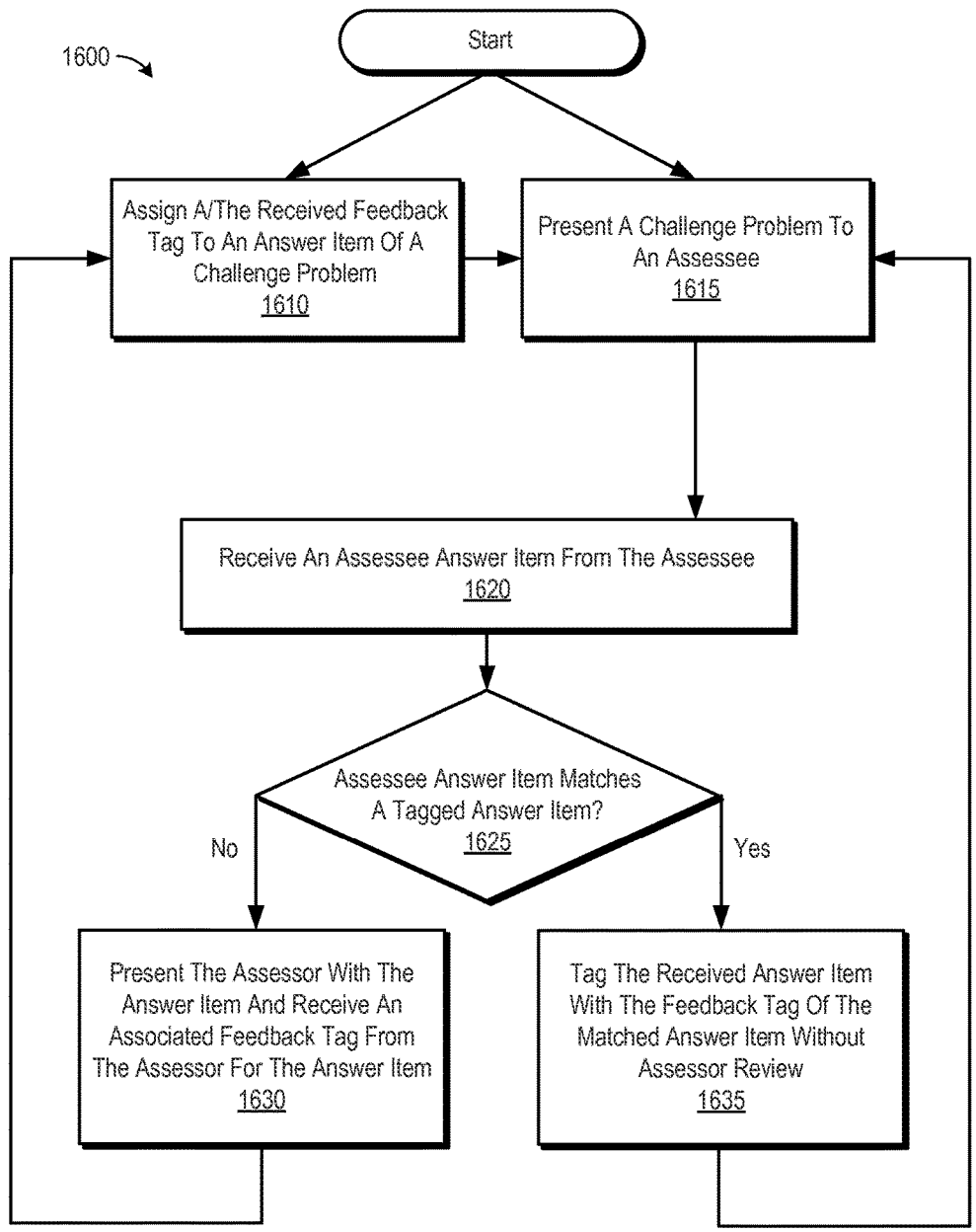
FIG. 16 illustrates a flowchart of a simplified method of automatically tagging assessee answer items that matched previously tagged assessee answer items.

FIG. 16 illustrates a flowchart of a simplified method 1600 of automatically tagging assesse answer items that matched previously tagged assessee answer items. As illustrated, the method may include an assessor creating an assessor answer item from scratch by assigning a feedback tag to an answer item of a challenge problem, at 1610. Alternatively, the method may begin by presenting a challenge problem to an assessee, at 1615. The assessee may provide an answer item to the challenge problem, at 1620. If the assessee answer item matches a tagged answer item, at 1625, the assessee answer item may be tagged with the same feedback as the matched answer item without further assessor review, at 1635. The next problem may then be presented to the assessee, at 1615.

Alternatively, if the assessee answer item does not match a tagged answer item, at 1625, then the answer item may be presented to the assessor for review and to receive an associated feedback tag from the assessor, at 1630. The newly tagged answer item may be stored for subsequent comparisons, at 1610. The next challenge problem may then be presented to the assessee, at 1615.

FIG. 16 shows real-time interactions with the system by both the assessee and the assessor. It is appreciated that the assessor may review unmatched answer items, at 1630, only after the assessment has been completed by all assessees. Similarly, the assessee may be presented with, at 1615, and provide answer items to, at 1620, all of the challenge problems of an assessment before any grading or matching, at 1625, is performed. In such a situation, boxes 1615 and 1620 may be replaced by a step in which a subsequent assessee answer item is reviewed by the computer-automated grading process.

Figure 17:
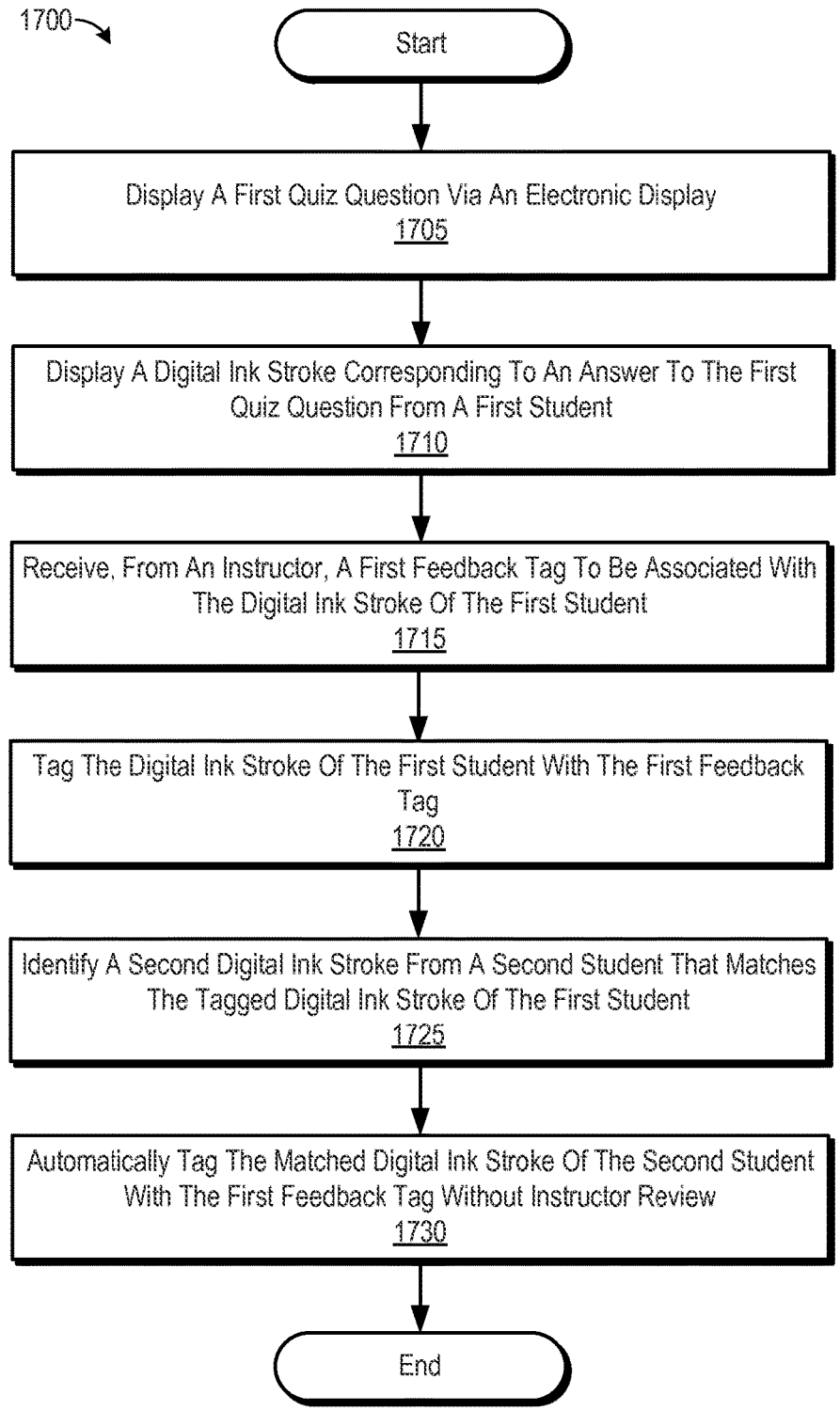
FIG. 17 illustrates a flowchart of a computer-assisted method of grading a quiz question answered by a plurality of students.

FIG. 17 illustrates a flowchart of a computer-assisted method 1700 of grading a quiz question answered by a plurality of students. A quiz question may be displayed on an electronic display, at 1705. The system may actually display it, or it may simply provide instructions to display a quiz question to a remote terminal or other client-side device. A digital ink stroke corresponding to an answer to the first quiz question provided by a first student may be displayed, at 1710. An instructor may provide a first feedback tag to be associated with the digital ink stroke of the first student, at 1715. For example, the instructor may provide an indication of how many points (negative or positive) the digital ink stroke made by the first student merits.

The system may then tag the digital ink stroke of the first student with the first feedback tag provided by the assessor, at 1720. The system may then identify one or more matching digital ink strokes made by other students. For example, the system may identify a second digital ink stroke from a second student that matches the tagged digital ink stroke of the first student, at 1725. Rather than present the matched digital ink stroke of the second student (and any other matched digital ink strokes of any other students) to the assessor for review, the system may automatically tag the matched digital ink stroke of the second student with the first feedback tag without any further instructor review, at 1730.

Figure 18:
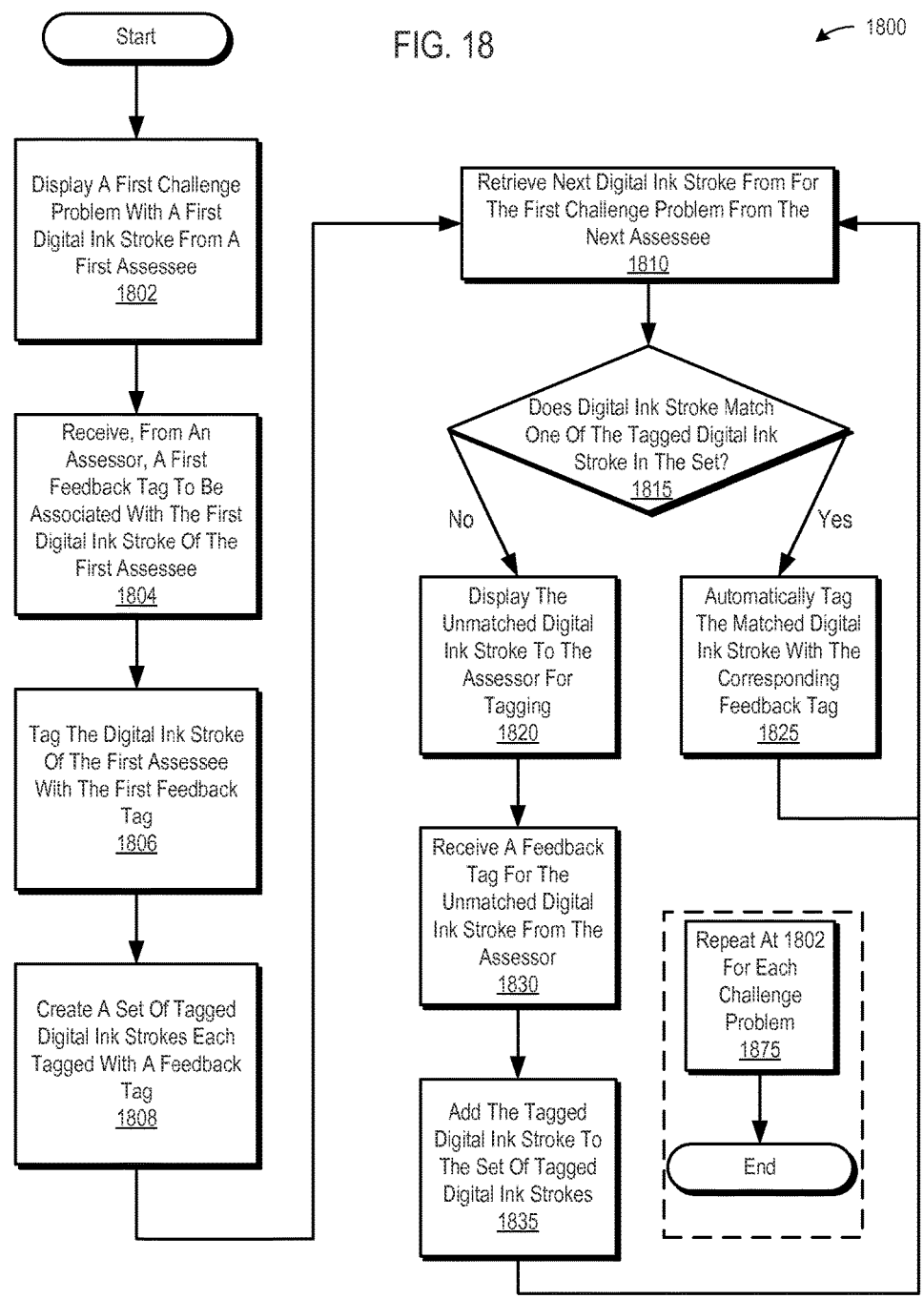
FIG. 18 illustrates a flowchart of a computer-assisted method of grading one or more challenge problems answered by a plurality of assessees.

FIG. 18 illustrates a flowchart of a computer-assisted method 1800 of grading one or more challenge problems answered by a plurality of assessees. A first challenge problem may be displayed with a first digital ink stroke (or alternatively a draggable object answer or an annotation answer item) from a first assessee, at 1802. The assessor may provide a first feedback tag to be associated with the first digital ink stroke of the first assessee, at 1804, thereby creating a first assessor digital ink stroke in the context of various embodiments described herein.

The digital ink stroke of the first assessee may be tagged with the first feedback tag within the system and for subsequent presentation to the assessee, at 1806. The system may create a set of tagged digital ink strokes each tagged with a feedback tag, at 1808. At this point, the set of tagged digital ink strokes may only contain one tagged digital ink strokes—the first digital ink stroke. As the assessor provides additional tags for other digital ink strokes for the same or other challenge problems from other assessees, the set of tagged digital ink strokes may be augmented.

The illustrated embodiment of the method includes a sequential analysis of each of the digital ink strokes from each assessee for each challenge problem. It is appreciated that other analysis approaches are possible. In the illustrated embodiment, the system may retrieve the next (at this point the second) digital ink stroke for the first challenge problem from the next (second) assesse, at 1810. If the digital ink stoke matches, at 1815, any of the set of tagged digital ink strokes (at this point the set includes only the first digital ink stroke), then the matched next digital ink stroke is automatically tagged with the same feedback tag, at 1825. If not, at 1815, then the unmatched digital ink stroke is presented to the assessor for tagging, at 1820, and a feedback tag is received from the assessor, at 1830. The newly tagged digital ink stroke is added to the set of tagged digital ink strokes, at 1835, and the next digital ink stroke is retrieved for analysis, at 1810.

The process may repeat for each digital ink stroke, for each assessee, for each challenge problem. Once all the digital ink strokes for the first challenge problem from all of the assessees have been tagged, the process may be repeated for the next challenge problem in the assessment and so on until it has been repeated for all of the challenge problems in the assessment, at 1875.

It is appreciated that for each of the methods described in FIGS. 16, 17, and 18, draggable object answers and/or annotation answers may be graded or otherwise evaluated instead of and/or in addition to digital ink stroke answer items.

This disclosure has been made with reference to various exemplary embodiments, including the best mode. However, those skilled in the art will recognize that changes and modifications may be made to the exemplary embodiments without departing from the scope of the present disclosure.

While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A non-transitory computer-readable medium storing instructions that, when executed by a processor, are configured to cause the processor to perform operations for grading an electronically administered assessment, the operations comprising:
   displaying a first challenge problem;
   displaying a digital ink stroke corresponding to an answer to the first challenge problem from a first assessee;
   receiving, from an assessor via a digital pen, a first feedback tag for association with the digital ink stroke of the first assessee;
   electronically tagging the digital ink stroke of the first assessee with the first feedback tag made by the assessor via the digital pen;
   identifying a second digital ink stroke corresponding to an answer to the first challenge problem from a second assessee that matches the electronically tagged digital ink stroke of the first assessee;
   automatically tagging the matched digital ink stroke of the second assessee with the first feedback tag made by the assessor via the digital pen, wherein each digital ink stroke comprises a notation spatially defined relative to the first challenge problem; and
   removing the automatically tagged and matched digital ink stroke of the second assessee from a set of answers still requiring assessment by the assessor.

2. The non-transitory computer-readable medium of claim 1, wherein the challenge problem comprises an image over which each of the digital ink strokes is overlaid.

3. The non-transitory computer-readable medium of claim 1, wherein displaying the first challenge problem comprises causing the first challenge problem to be displayed on an electronic display, and wherein displaying the digital ink stroke of the first assessee comprises causing the digital ink stroke of the first assessee to be displayed on an electronic display.

4. The non-transitory computer-readable medium of claim 1, wherein each challenge problem comprises at least one of: a solicitation for a correct answer to be underlined, a solicitation for a notation to be made indicating which of a plurality of answers is a correct answer, a solicitation for one region of the challenge problem to be associated via a notation with another region of the challenge problem, and a solicitation for a notation identifying a portion of the challenge problem.

5. The non-transitory computer-readable medium of claim 1, wherein the first feedback tag comprises at least one of: an indication that a digital ink stroke is incorrect, an indication that a digital ink stroke is correct, a positive numeric value, a negative numeric value, a letter grade, descriptive text, and an explanation.

6. The non-transitory computer-readable medium of claim 1, wherein each digital ink stroke comprises a feature defined with respect to the challenge problem, the feature comprising at least one of:
   a starting point defined with respect to a region of the challenge problem,
   an ending point defined with respect to a region of the challenge problem, and
   an intersecting portion defined with respect to a region of the challenge problem over which the assessor digital ink stroke passes.

7. The non-transitory computer-readable medium of claim 6, wherein identifying the second digital ink stroke from the second assessee that matches the tagged digital ink stroke of the first assessee comprises:
   matching at least one feature of the digital ink stroke of the first assessee with at least one feature of the digital ink stroke of the second assessee.

8. The non-transitory computer-readable medium of claim 1, wherein each of the digital ink strokes comprises at least one of: a series of dots, a line, a vector, an arrow, a polygon, a rectangle, a circle, a perimeter substantially enclosing a portion of the challenge problem, a notation connecting at least two regions of the challenge problem, text, an image, a graphic, and a notation spatially associating at least two regions of the challenge problem.

9. The non-transitory computer-readable medium of claim 1, wherein the operations further comprise:
   displaying a third digital ink stroke corresponding to an answer to the first challenge problem from a third assessee;
   receiving, from the assessor, a second feedback tag associated with the digital ink stroke of the third assessee, wherein the second feedback tag is different from the first feedback tag, and wherein the digital ink stroke of the third assessee is different from the digital ink stroke of the first assessee;
   tagging the digital ink stroke of the third assessee with the second feedback tag;
   identifying a digital ink stroke corresponding to answers to the first challenge problem from each of a plurality of assessees that matches the tagged digital ink stroke of the third assessee; and
   tagging each of the matched digital ink strokes of the plurality of assessees with the second feedback tag.

10. The non-transitory computer-readable medium of claim 1, wherein the operations further comprise:
   determining a sequence of digital ink strokes corresponding to answers to the first challenge problem from each of a plurality of assessees to be displayed for assessment by the assessor, wherein the sequence includes the first digital ink stroke, the second digital ink stroke and each digital ink stroke of a set of at least one additional digital ink strokes, including at least a third digital ink stroke; and
   removing digital ink strokes from the sequence that have been matched and tagged with a feedback tag prior to their being displayed for assessment by the assessor.

11. The non-transitory computer-readable medium of claim 1, wherein the digital pen comprises a stylus for interacting with a digital touch screen digitizer.

12. The non-transitory computer-readable medium of claim 11, wherein the digital pen comprises an active stylus.

13. The non-transitory computer-readable medium of claim 1, wherein the digital pen comprises a portion of the assessor interacting with a display screen digitizer.

14. The non-transitory computer-readable medium of claim 1, wherein the operations further comprise:
delivering to the second assessee the first feedback tag associated with the digital ink stroke of the second assessee; and
receiving from the second assessee a request for reconsideration with regard to the first feedback tag associated with the digital ink stroke of the second assessee.

15. The non-transitory computer-readable medium of claim 14, wherein the operations further comprise:
delivering the request for reconsideration from the second assessee to the assessor;
displaying the second digital ink stroke of the second assessee to the assessor in conjunction with delivering the request for reconsideration; and
receiving, from the assessor, a replacement feedback tag to replace the first feedback tag previously associated with the digital ink stroke of the second assessee.

16. The non-transitory computer-readable medium of claim 14, wherein the request for reconsideration comprises at least one of: an audio message, a text message, a video message, an explanation of the second digital ink stroke, a replacement digital ink stroke that is different from and provided to replace the second digital ink stroke, and an identification of the challenge problem associated with the second digital ink stroke.

17. A non-transitory computer-readable medium storing instructions that, when executed by a processor, are configured to cause the processor to perform operations for electronically grading an administered assessment, the operations comprising:
receiving a plurality of administered assessments, each assessments having a plurality of challenge problems and the plurality of assessments having a plurality of digital ink strokes from a plurality of distinct assessees for a first one of the plurality of challenge problems;
determining a sequence for which to sequentially display the plurality of digital ink strokes for assessment by an assessor via an electronic display and an associated user input device, wherein each of the plurality of digital ink strokes corresponds to an answer to a first challenge problem from one of a plurality of distinct assessees, and wherein each digital ink stroke comprises a notation spatially defined relative to the first challenge problem;
displaying, via the electronic display, a first digital ink stroke of the plurality of digital ink strokes that corresponds to a first answer to the first challenge problem from a first assessee of the plurality of assessees;
receiving, from an assessor via a digital pen, a first feedback tag to be associated with the digital ink stroke of the first assessee;
electronically tagging the digital ink stroke of the first assessee with the first feedback tag;
identifying a first number of digital ink strokes of the plurality of digital ink strokes that each correspond to an answer to the first challenge problem from a corresponding number of assessees that matches the tagged digital ink stroke of the first assessee;
electronically tagging the matched digital ink strokes of the first number of assessees with the first feedback tag;
removing the tagged digital ink strokes from the sequence that have been matched and tagged with the first feedback tag;
displaying a second digital ink stroke of the remaining plurality of digital ink strokes that corresponds to a second answer, that is different than the first answer, to the first challenge problem from a second assessee of the plurality of assessees;
receiving, from the assessor, a second feedback tag to be associated with the digital ink stroke of the second assessee;
tagging the digital ink stroke of the second assessee with the second feedback tag;
identifying a second number of digital ink strokes of the plurality of digital ink strokes that each correspond to an answer to the first challenge problem from a corresponding number of assessees that matches the tagged digital ink stroke of the second assessee;
tagging the matched digital ink strokes of the second number of assessees with the second feedback tag; and
removing the tagged digital ink strokes from the sequence that have been matched and tagged with the second feedback tag.

18. The non-transitory computer-readable medium of claim 17, wherein each of the plurality of digital ink strokes remaining in the sequence is displayed one at a time.

19. A non-transitory computer-readable medium storing instructions that, when executed by a processor, are configured to cause the processor to perform operations for grading an electronically administered assessment, the operations comprising:
displaying a first challenge problem;
displaying a set of digital ink strokes corresponding to an answer to the first challenge problem from a first assessee, wherein each digital ink stroke comprises a notation spatially defined relative to the first challenge problem;
comparing each digital ink stroke in the set of digital ink strokes of the first assessee to a set of tagged digital ink strokes, wherein each tagged digital ink stroke is associated with a feedback tag provided by an assessor via a digital pen;
matching at least one digital ink stroke of the first assessee with a tagged digital ink stroke provided by the assessor via the digital pen;
electronically tagging the matched digital ink stroke of the first assessee with a feedback tag associated with the matching tagged digital ink stroke provided by the assessor; and
displaying a graphical representation of the feedback tag associated with the matched digital ink stroke.

* * * * *